(12) United States Patent
Mori et al.

(10) Patent No.: US 12,555,382 B2
(45) Date of Patent: Feb. 17, 2026

(54) DETECTION SYSTEM, METHOD, AND STORAGE MEDIUM

(71) Applicant: OMRON CORPORATION, Kyoto (JP)

(72) Inventors: Mizuki Mori, Kyoto (JP); Yasuhiro Ujita, Kyoto (JP); Shinya Fujimoto, Kyoto (JP)

(73) Assignee: OMRON CORPORATION, Kyoto (JP)

(*) Notice: Subject to any disclaimer, the term of this patent is extended or adjusted under 35 U.S.C. 154(b) by 316 days.

(21) Appl. No.: 18/362,440

(22) Filed: Jul. 31, 2023

(65) Prior Publication Data

US 2024/0071085 A1 Feb. 29, 2024

(30) Foreign Application Priority Data

Aug. 31, 2022 (JP) ................... 2022-138011

(51) Int. Cl.
*G06V 20/52* (2022.01)
*G06T 7/70* (2017.01)
(Continued)

(52) U.S. Cl.
CPC ............. *G06V 20/52* (2022.01); *G06T 7/70* (2017.01); *G06T 7/90* (2017.01); *G06V 10/141* (2022.01)

(58) Field of Classification Search
CPC ...... G06V 20/52; G06V 10/141; G06V 10/56; G06V 10/62; G06V 40/10; G06T 7/70; G06T 7/90; G06T 5/92; G06T 2207/10024; G06T 2207/30196; G06T 2207/30241; G06T 7/246; G06T 7/73; G06T 7/0004
(Continued)

(56) References Cited

U.S. PATENT DOCUMENTS 11,457,271 B1 * 9/2022 Faulkner ............... H04N 7/152
11,678,011 B1 * 6/2023 Fu .................... H04N 21/8549
348/143

(Continued)

FOREIGN PATENT DOCUMENTS

| JP | 2020-204819 A | 12/2020 |
| WO | 2006/096000 A1 | 9/2006 |
| WO | 2016/121305 A1 | 8/2016 |

OTHER PUBLICATIONS

Extended European Search Report dated Jan. 4, 2024 in Application No. 23188497.4.

*Primary Examiner* — Ali Bayat
(74) *Attorney, Agent, or Firm* — Sughrue Mion, PLLC

(57) ABSTRACT

A method includes: a step of acquiring a captured image of a workplace captured by a camera that is installed above the workplace and has an imaging direction substantially vertically downward; a step of detecting a partial image representing a wearing object worn by a worker from the captured image acquired; a step of acquiring position information indicating a position where the partial image is detected in the acquired captured image; acquiring, for the acquired captured image, adjustment information for displaying the captured image in which brightness is adjusted; and outputting, for the acquired captured image, the position information acquired from the captured image and the adjustment information acquired for the captured image.

18 Claims, 21 Drawing Sheets

(51) Int. Cl.
*G06T 7/90* (2017.01)
*G06V 10/141* (2022.01)

(58) Field of Classification Search
USPC .......................................................... 382/100
See application file for complete search history.

(56) References Cited

U.S. PATENT DOCUMENTS

| | | | |
|---|---|---|---|
| 2009/0232357 A1* | 9/2009 | Angell | G06V 20/52 382/103 |
| 2013/0107041 A1* | 5/2013 | Norem | H04N 23/60 348/169 |
| 2017/0086712 A1* | 3/2017 | Mauro | A61B 5/1101 |
| 2017/0262725 A1* | 9/2017 | Houri | G06V 10/56 |
| 2018/0114068 A1* | 4/2018 | Balasundaram | G06T 7/248 |
| 2018/0300579 A1 | 10/2018 | Tojo | |
| 2019/0108392 A1 | 4/2019 | Wang et al. | |
| 2022/0230440 A1 | 7/2022 | Fujimoto | |

* cited by examiner

FIG.7

| COLOR ID: G | WORKER ID: "124" | |
|---|---|---|
| PROCESS ID | IN TIME | OUT TIME |
| Pr(1) | 9/1 10:00:05 | 9/1 10:03:05 |
| Pr(2) | 9/1 10:03:08 | 9/1 10:06:05 |
| Pr(3) | : | : |
| Pr(4) | : | : |
| Pr(5) | : | : |
| Pr(6) | 9/1 10:11:00 | 9/1 10:13:08 |

FIG.9

| COLOR ID: P | WORKER ID: "256" | |
|---|---|---|
| PROCESS ID | IN TIME | OUT TIME |
| Pr(1) | 9/1 11:00:10 | 9/1 11:05:00 |
| Pr(2) | 9/1 11:06:00 | 9/1 11:08:00 |
| Pr(1) | 9/1 11:10:00 | 9/1 11:12:00 |
| Pr(4) | 9/1 11:13:00 | 9/1 11:16:00 |
| Pr(5) | 9/1 11:16:05 | 9/1 11:18:00 |

FIG.10

| COLOR ID: Y | WORKER ID: "25" | |
|---|---|---|
| PROCESS ID | IN TIME | OUT TIME |
| Pr(3) | 9/1 10:00:00 | 9/1 10:15:00 |

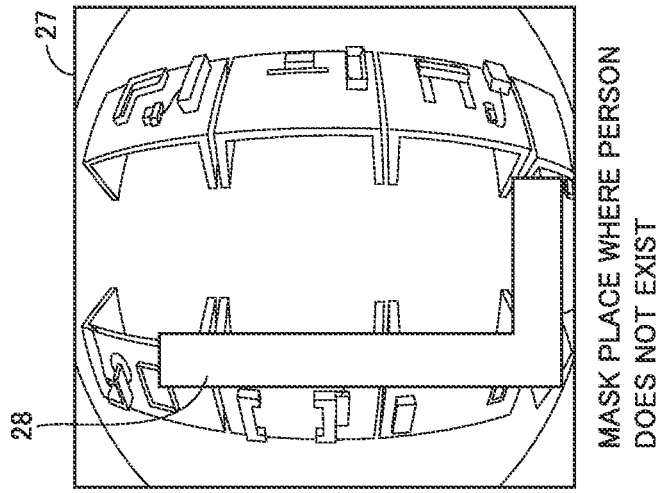
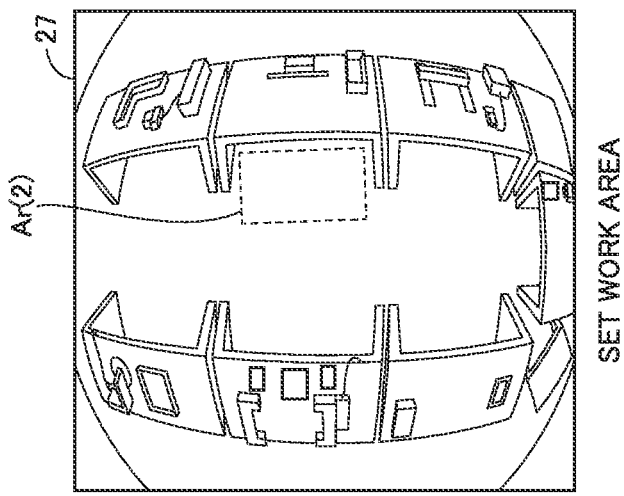
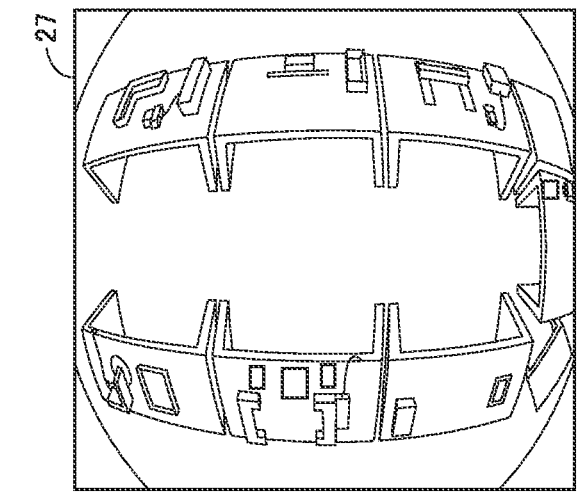

COMPLEMENTED TRAJECTORY

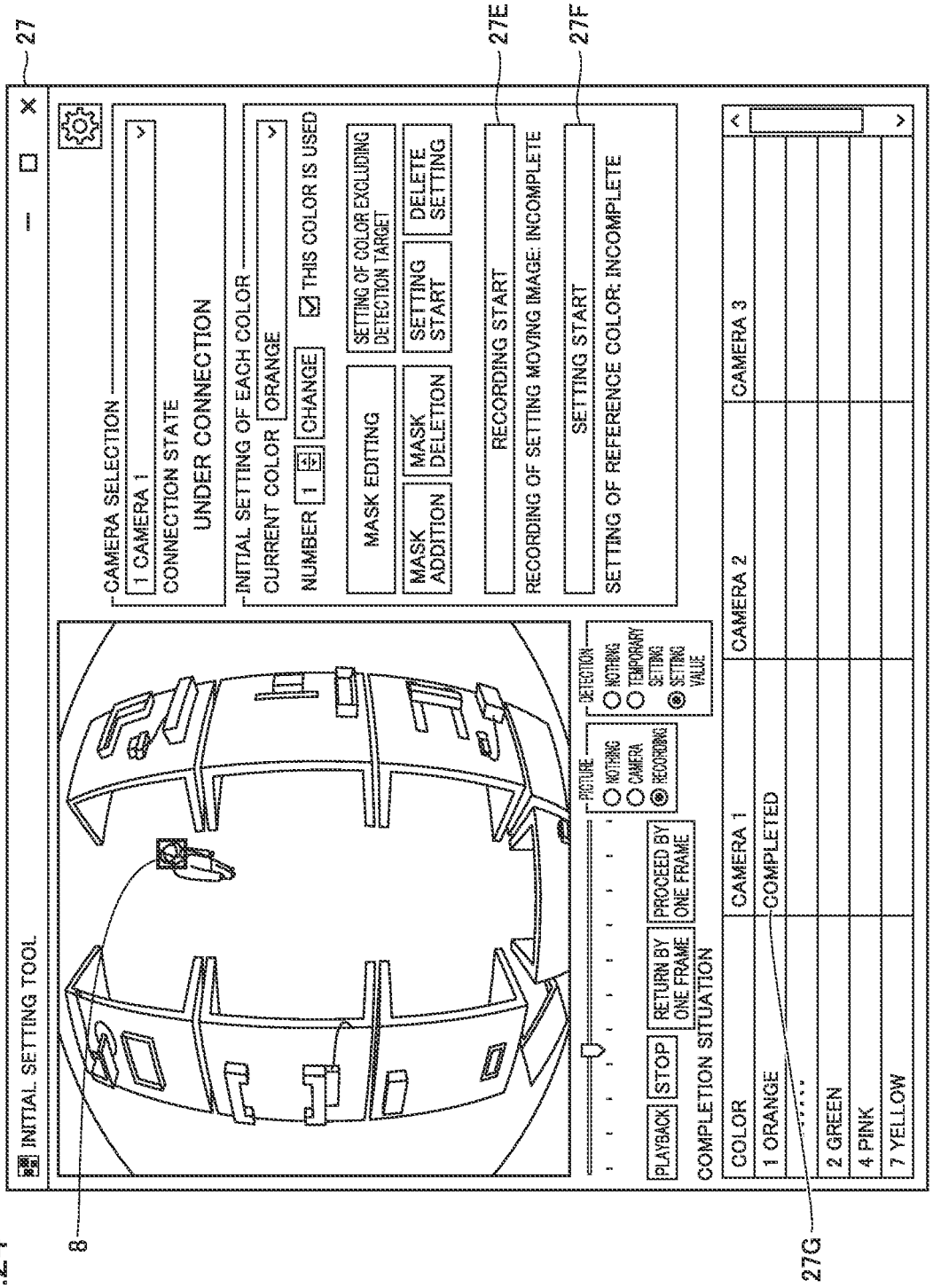

DETECTION SYSTEM, METHOD, AND STORAGE MEDIUM

CROSS REFERENCE TO RELATED APPLICATIONS

This nonprovisional application is based on Japanese Patent Application No. 2022-138011 filed on Aug. 31, 2022, with the Japan Patent Office, the entire contents of which are hereby incorporated by reference.

BACKGROUND OF THE INVENTION

Field of the Invention

The present disclosure relates to a detection system, a method, and a program.

Description of the Background Art

In a production site including a plurality of processes, work analysis is performed to improve work efficiency. In such work analysis, as a mechanism detecting a "worker position" at the production site, there is a method for using radio, but a camera system that does not require carrying of a device has been proposed. A "ceiling camera" provided on a ceiling of a workplace is used for the camera system. For example, Japanese Patent Laying-Open No. 2020-204819 proposes a technique for detecting the worker position using an image captured by a ceiling camera and analyzing detected information.

SUMMARY OF THE INVENTION

In the case of analyzing the information of the detected worker position as disclosed in Japanese Patent Laying-Open No. 2020-204819, there is a need for a user to provide not only the information but also the image captured by the camera.

Therefore, an object of the present disclosure is to provide a system, a method, and a program for outputting the position of the worker in the workplace and the captured image of the camera used for detecting the position.

According to an example of the present disclosure, a detection system includes: an image acquisition unit configured to acquire a captured image of a workplace, the captured image being captured by a camera that is installed above the workplace and has a substantially vertically downward imaging direction; a partial image detection unit configured to detect a partial image representing a wearing object worn by a worker from the captured image acquired; a position information acquisition unit configured to acquire position information indicating a position where the partial image is detected in the acquired captured image; an adjustment information acquisition unit configured to acquire, for the acquired captured image, adjustment information for displaying the captured image in which brightness is adjusted; and an output unit configured to output, for the acquired captured image, the position information acquired from the captured image and the adjustment information acquired for the captured image.

According to the detection system described above, the position information acquired from the captured image is output, and the captured image used for position detection can be displayed. The captured image displayed in this manner can include the captured image in which the brightness is adjusted by the adjustment information.

In the above detection system, the adjustment information includes the captured image in which the brightness is adjusted based on an adjustment parameter. Thus, the adjustment information can be output as information including the captured image in which the brightness is adjusted.

In the above detection system, the adjustment information includes the acquired captured image and an adjustment parameter for brightness adjustment to the captured image. Thus, the adjustment information can be output as the information including the captured image and the parameter for the brightness adjustment of the captured image.

In the above detection system, the adjustment information acquisition unit includes a setting unit configured to output a GUI that receives a user operation for setting the adjustment parameter. Thus, the GUI acquiring the adjustment parameter is provided.

In the above detection system, the GUI includes an area displaying a captured image before the brightness is adjusted, an object receiving a user operation for changing the adjustment parameter, and an area displaying the captured image in which the brightness is adjusted based on the adjustment parameter. Such the GUI provides the user with an environment in which the user can perform the user operation of the parameter adjustment while viewing the images before and after the brightness adjustment is performed.

The detection system further includes a storage unit configured to store reference information referred to in order to determine a color type; and a color detection unit configured to detect a color type of the wearing object from the partial image representing the wearing object of the worker in the acquired captured image based on the reference information stored in the storage unit. Thus, the detection system detects the color type of the position-detected partial image.

In the above detection system, the reference information includes, for each of a plurality of types of colors, a distribution of an attribute value of each of the colors in a color space, and the color detection unit detects the color type of the wearing object based on whether an attribute value of a color owned by the partial image representing the wearing object of the worker in the acquired captured image corresponds to the attribute value in the distribution of various colors indicated by the reference information. Thus, color center information about various colors can be used to detect the color type.

The above detection system further includes a setting unit configured to acquire the reference information and store the reference information in the storage unit, in which the reference information includes a distribution in the color space of the attribute value of the color owned by the partial image of the wearing object in the captured image captured by the camera under different imaging conditions for the wearing object of each of the plurality of types of colors. This provides a function setting distribution corresponding to various colors covering various imaging conditions of the camera in the detection system.

The above detection system further includes a mask area setting unit configured to set a mask area in a captured image obtained by imaging the workplace, in which the position information acquisition unit acquires the position information indicating a position of the partial image representing the wearing object in an area excluding the mask area in the acquired captured image. Thus, the mask area to be excluded from the detection target of the position information can be set.

In the above detection system, the captured image acquired by the image acquisition unit includes a captured image captured in time series by the camera, the position information acquisition unit further acquires information for time when the partial image is detected in the time-series captured image acquired, and the position information includes the information for the time in association with the position information. The position information acquired in this manner can indicate information (position and time) obtained by tracking the movement of the partial image.

According to an example of the present disclosure, a method includes: acquiring a captured image of a workplace captured by a camera that is installed above the workplace and has a substantially vertically downward imaging direction; detecting a partial image representing a wearing object worn by a worker from the captured image acquired; acquiring position information indicating a position where the partial image is detected in the acquired captured image; acquiring, for the acquired captured image, adjustment information for displaying the captured image in which brightness is adjusted; and outputting, for the acquired captured image, the position information acquired from the captured image and the adjustment information acquired for the captured image.

According to an example of the present disclosure, a non-transitory machine-readable storage medium having stored thereon instructions that, when executed, cause one or more processors to perform the above method is provided.

According to the present disclosure, the position of the worker in the workplace and the captured image of the camera used for detecting the position can be output.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a view illustrating an example of flow line information 70 acquired from the trajectory information 80 in FIG. 6.

FIG. 9 is a view illustrating an example of the flow line information 70 acquired from the trajectory information 80 in FIG. 8.

FIG. 10 is a view illustrating an example of the flow line information 70 acquired from the trajectory information 80 in FIG. 8.

FIGS. 18A, 18B and 18C are each a view illustrating an example of area setting of the embodiment.

FIG. 24 is a view schematically illustrating an example of the GUI screen setting the color distribution information 241 of the embodiment.

DESCRIPTION OF THE PREFERRED EMBODIMENTS

Figure 1:
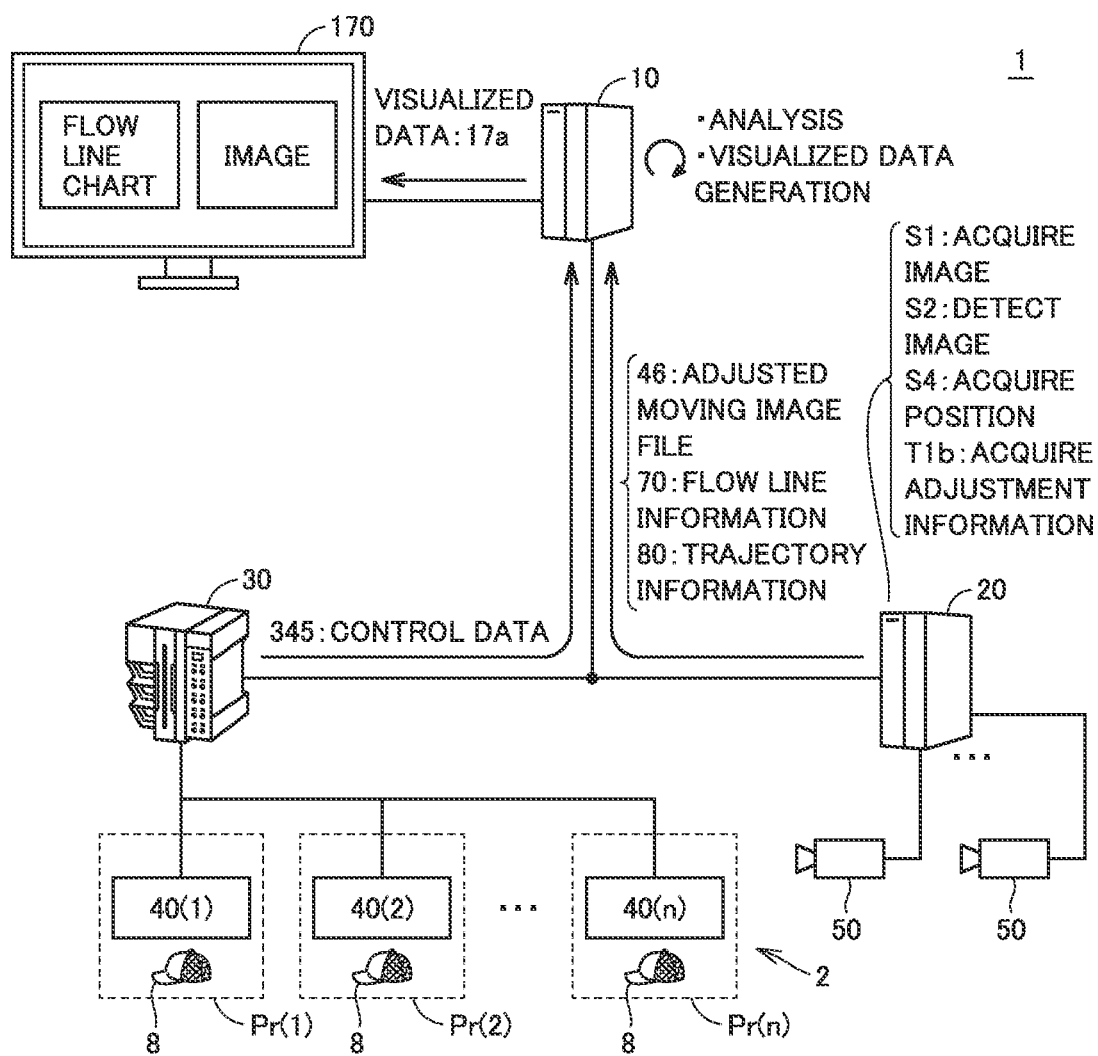
FIG. 1 is a view illustrating an example of a network system 1 to which a detection system according to an embodiment is applied.

With reference to the drawings, an embodiment of the present invention will be described in detail. The same or equivalent portion in the drawings is denoted by the same reference numeral, and the description will not be repeated. The following modifications described below may selectively be combined as appropriate.

A. Application Example

With reference to FIG. 1, an application example of a detection system according to an embodiment will be described below. FIG. 1 is a view illustrating an example of a network system 1 to which the detection system of the embodiment is applied. As illustrated in FIG. 1, network system 1 includes an analysis device 10, an information processing device 20, a control device 30 such as a programmable logic controller (PLC), a plurality of machines 40 disposed in a workplace 2 corresponding to a production site, and one or a plurality of cameras 50.

For example, camera 50 is connected to information processing device 20 through a local area network (LAN). Power over Ethernet (PoE) is applied to a LAN cable, so that power is supplied to camera 50 through the LAN cable. Furthermore, control device 30 and information processing device 20 may be provided as an IPC (Industrial Personal Computer) in which control device 30 and information processing device 20 are integrally configured.

In workplace 2, for example, a worker is uniquely identified by a color type of a hat 8 worn by the worker. The color of hat 8 is a type of color that is not used for equipment, members, or the like disposed in workplace 2, and is more preferably a bright and vivid type of color.

In workplace 2, for example, various products are manufactured through a plurality of processes Pr including equipment. For example, the plurality of processes Pr include a "painting" process, an "assembly of a main workpiece" process, an "incorporation of a main workpiece into a main body" process, and an "inspection" process. When each of the plurality of processes Pr is required to be distinguished, suffixes such as "(1)", "(2)", "(3)", . . . , "(n)" are added to signs to distinguish the plurality of processes Pr. For example, the plurality of processes Pr are distinguished by being described as "process Pr (1)", "process Pr (2)", . . . , and "process Pr (n)". When each of the plurality of processes is not required to be particularly distinguished, each of the plurality of processes is simply referred to as "process Pr".

The plurality of machines 40 are used in the plurality of processes Pr. That is, the process Pr and the machine 40 are previously associated. The suffixes such as "(1)", "(2)", . . . "(n)" are added to the signs to distinguish machines 40 from each other when the plurality of machines 40 are required to be distinguished from each other, and machines 40 are simply referred to as "machine 40" when machines 40 are not required to be distinguished from each other. For example, at least one machine 40(*n*) is used to perform process Pr(m). That is, at least one machine 40(1) is used to perform process Pr(1). Similarly, at least one machine 40(2) is used to perform process Pr(2).

The plurality of processes Pr may include a cooperative process in which cooperative work between the worker and machine 40 is repeatedly performed for each cycle. For example, the cooperative work includes input work (work of inputting the workpiece to machine 40) by an operator and main work (work processing or the like) performed by machine 40 after the input work. The plurality of processes Pr may include a process in which machine 40 is not provided. In such process Pr, the worker performs work without using machine 40. In this manner, machine 40 should not be construed as an essential configuration in process Pr.

Camera 50 is a camera installed above workplace 2, and has a substantially vertically downward imaging direction. Specifically, camera 50 is installed at a position (typically, a ceiling beam or the like) where entire workplace 2 can be viewed, and generates moving image data (hereinafter, simply referred to as "moving image") configured of time-series image data by capturing the image of entire workplace 2. For example, camera 50 includes a wide-angle camera or an ultra-wide-angle camera, and may be installed to be fixed or movable.

Information processing device 20 is communicably connected to control device 30 and camera 50. Information processing device 20 acquires the captured image output from camera 50 (step S1), and detects a partial image representing the hat worn by the worker from the acquired image (step S2). Information processing device 20 acquires position information indicating a position where the partial image described above is detected in the captured image (step S4). Furthermore, information processing device 20 acquires adjustment information displaying the captured image in which brightness is adjusted for the captured image acquired from camera 50 (step T1*b*). For the captured image acquired from camera 50, information processing device 20 transfers the position information acquired from the captured image and the adjustment information acquired for the captured image to analysis device 10. The position information transferred from information processing device 20 to analysis device 10 includes at least trajectory information 80 obtained by tracking the movement of the partial image of a wearing object in the moving image acquired from camera 50. Furthermore, the position information may include later-described flow line information 70 acquired based on trajectory information 80. Furthermore, the adjustment information transferred to analysis device 10 includes an adjusted moving image file 46 in which the brightness of the moving image used to acquire the position information, which is the captured image of camera 50, is adjusted by, for example, gamma correction.

Control device 30 controls entire workplace 2 and is communicably connected to each of the plurality of machines 40. Control device 30 is typically a programmable logic controller (PLC). Various types of Industrial Ethernet (registered trademark) are used as a network that communicably connects control device 30 and the plurality of machines 40. For example, EtherCAT (registered trademark), Profinet IRT, MECHATROLINK (registered trademark)-III, Powerlink, SERCOS (registered trademark)-III, and CIP Motion are known as Industrial Ethernet (registered trademark), and any of these may be adopted. Furthermore, a field network other than Industrial Ethernet (registered trademark) may be used. For example, when motion control is not performed, DeviceNet or CompoNet/IP (registered trademark) may be used.

Control device 30 operates as a master in a master-slave control system, and acquires information from each of the plurality of machines 40 as an input device (measurement device) as input data. Control device 30 performs arithmetic processing using the acquired input data according to a previously-incorporated user program. Control device 30 determines a control content for the master-slave control system according to execution of the arithmetic processing, and outputs control data corresponding to the control content to each of the plurality of machines 40 as output data. Control device 30 repeatedly performs acquisition of the input data indicating a state from each of the plurality of machines 40 and acquisition of the control data to each of the plurality of machines 40 at a predetermined period (control period). Control device 30 transfers control data 345 including the control data (output data) and the input data that are acquired every predetermined period to analysis device 10 at predetermined timing.

Analysis device 10 is communicably connected to information processing device 20 and control device 30, and analyzes a work situation of workplace 2 including the plurality of processes Pr. For example, analysis device 10 includes a general-purpose computer, and is connected to a display device 170 such as a display.

Analysis device 10 receives adjusted moving image file 46 and the position information that are transferred from information processing device 20. Analysis device 10 analyzes the position information received from information processing device 20, generates visualized data 17*a* (graphical data) visualizing an analysis result, and transfers the visualized data to display device 170. Visualized data 17*a* includes data displaying the image based on adjusted moving image file 46 obtained by adjusting the brightness of the captured image used to acquire the position information. In addition, analysis device 10 causes display device 170 to display a flow line chart and display a brightness-adjusted image based on visualized data 17*a*. The flow line chart is information based on flow line information 70, and includes a graph indicating a stay time or a work time of each process Pr for the worker.

In addition, analysis device 10 may generate visualization data visualizing information based on control data 345 that is transferred from control device 30 in association with the flow line chart. For example, analysis device 10 may extract a time slot in which machine 40 operated for each process Pr based on control data 345, and generate the visualization data visualizing an extracted operation time slot in association with the stay time in process Pr.

According to the embodiment, the position of the worker in workplace 2 can be detected by the partial image of hat 8 worn by the worker. Furthermore, the captured image used to detect the position is displayed on display device 170 as the image in which brightness is adjusted, so that the image with excellent visibility can be provided to the user.

In the detection system of FIG. 1, information processing device 20 is a subject that performs the processing for detecting a partial image (step S2), acquiring position information (step S4), and acquiring adjustment information (step T1$b$), but the subject that performs these processing is not limited to information processing device 20. For example, the subject that analysis device 10 performs these pieces of processing may be configured to be distributed among the devices. Distributed processing, in which the processing for acquiring the moving image from camera 50 (step S1) and the processing for acquiring the adjustment information (step T1$b$) are performed by information processing device 20 and other pieces of processing (steps S2, S4) are performed by analysis device 10, can be implemented when the detection system is configured in this manner. How the processing is distributed in the detection system is not limited thereto. Furthermore, the detection system may be configured such that camera 50 implements processing modules of steps S1, S2, and S4. Hereinafter, the case where the pieces of processing of steps S1, S2, S4, and T1$b$ are performed by information processing device 20 will be described as a specific application example of the detection system.

B. Device Configuration

Figure 2:
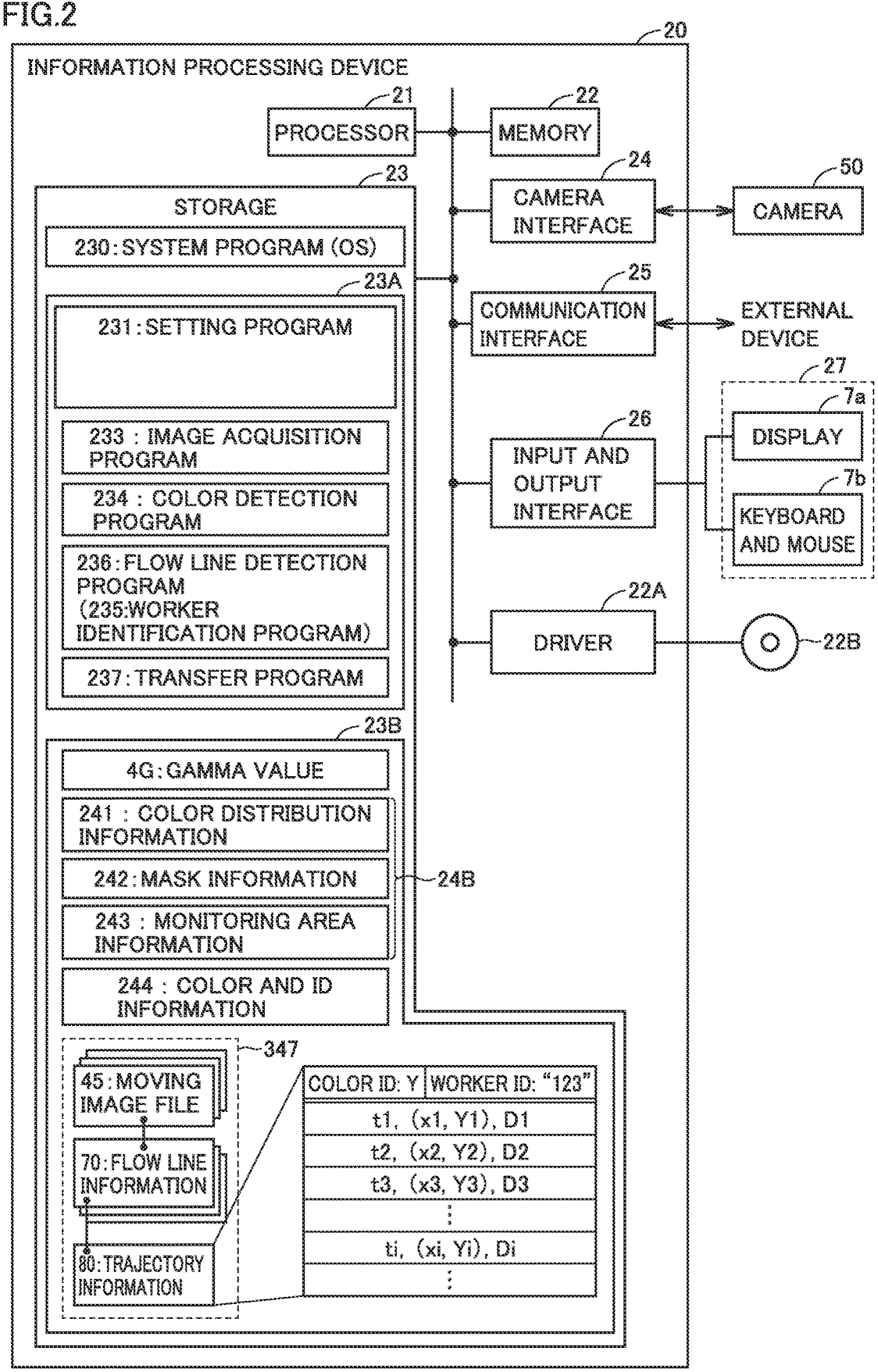
FIG. 2 is a schematic diagram illustrating an example of a hardware configuration of an information processing device.

FIG. 2 is a schematic diagram illustrating an example of a hardware configuration of the information processing device. Information processing device 20 typically has a structure according to a general-purpose computer architecture. As illustrated in FIG. 2, information processing device 20 includes a processor 21 such as a central processing unit (CPU) or a micro-processing unit (MPU), a memory 22, a storage 23, a camera interface 24, a communication interface 25, an input and output interface 26, and a driver 22A. These units are data-communicably connected to each other through a bus.

Processor 21 reads various programs non-transitorily stored in storage 23, deploys the program in memory 22, and performs the program, thereby implementing various pieces of processing of the embodiment.

Memory 22 is typically a volatile storage device such as a dynamic random access memory (DRAM), and stores the program read from storage 23, the moving image received from camera 50, and the like.

A storage medium such as an optical disk 22B is detachably attached to driver 22A, and information (program, data) is read from the attached storage medium and the read information is stored in storage 23.

Camera interface 24 mediates data transmission between processor 21 and camera 50. More specifically, an imaging instruction is output from processor 21 to camera 50 through camera interface 24. Camera interface 24 outputs the moving image received from camera 50 to processor 21 in response to the imaging instruction. In FIG. 2, one camera 50 is connected to information processing device 20.

Communication interface 25 mediates the data transmission between processor 21 and an external device (for example, control device 30 and analysis device 10). Communication interface 25 typically includes Ethernet (registered trademark), or a Universal Serial Bus (USB).

A display 7$a$ that outputs information and an operation unit 7$b$ such as a keyboard and a mouse operated to receive a user instruction to information processing device 20 are connected to input and output interface 26. Display 7$a$ and operation unit 7$b$ may be provided as an integrally configured touch pad 27.

Storage 23 typically includes a non-volatile magnetic storage device such as a hard disk drive. Storage 23 non-transitorily stores a system program 230 including an operating system (OS), an application program 23A including a plurality of instructions to be executed by a computer (processor 21), and information 23B.

Application program 23A includes a setting program 231, an image acquisition program 233, a color detection program 234, a flow line detection program 236 including a worker identification program 235, and a transfer program 237.

Information 23B includes information acquired by setting processing described later, color and ID information 244 including a plurality of types of colors and worker IDs associated with the various colors, and detection information 347. The information acquired by the setting processing includes a gamma value 4G as a parameter of image brightness adjustment processing and information 24B used for detection. Information 24B includes color distribution information 241, mask information 242, and monitoring area information 243 indicating monitoring area Ar, and these pieces of information will be described later in detail.

Detection information 347 includes at least one moving image file 45, and flow line information 70 and trajectory information 80 that are associated with each moving image file 45. For example, flow line information 70 and trajectory information 80 have a format of a comma separated values (CSV) file. Moving image file 45 constitutes the moving image including a plurality of time-series frames captured by camera 50. This moving image includes a predetermined number of frame images per second.

In the embodiment, the analysis system treats the frame image corresponding to the imaging visual field of camera 50, namely, the frame image obtained by imaging workplace 2 in a vertically downward direction as a two-dimensional coordinate plane, thereby converting the position where the partial image of the hat is detected in the frame image into a coordinate ($x_i, y_i$).

In addition, the analysis system detects orientation Di of the hat on the two-dimensional coordinate plane by analyzing the partial image of the hat as described later.

Trajectory information 80 includes a color ID indicating the color type of the hat detected from the moving image of corresponding moving image file 45, the worker ID associated with the color type, and trajectory information 80 configured of a plurality of time-series elements ($t_i, (x_i, y_i), D_i$).

The time-series element ($t_i, (x_i, y_i), D_i$) of trajectory information 80 is information acquired by tracing (hereinafter, also referred to as tracking) the movement of the image (partial image) of hat 8 having the color of the type indicated by the corresponding color ID in the corresponding moving image. Specifically, the element includes a time ti, and a position (xi,yi) and orientation Di detected at time ti in association with time ti. Flow line information 70 indicates information acquired by the analysis system by analyzing trajectory information 80 based on time-series elements (ti,(xi,yi),Di) of corresponding trajectory information 80. Flow line information 70 indicates time during which the worker stays in later-described monitoring area Ar that is a predetermined area of each process Pr.

Application program 23A installed in storage 23 is distributed while being stored in the storage medium (recording medium) such as optical disk 22B or a memory card. Similarly, information 23B installed in storage 23 can also be distributed while being stored in such the storage medium (recording medium). Alternatively, application program 23A and information 23B may be downloaded from a distribution server (not illustrated) or the like through communication interface 25.

When the computer having the structure following the general-purpose computer architecture such as information processing device 20 is used, a system program 230 including an OS providing a basic function of the computer may be installed in addition to the application providing the function of the embodiment. In this case, application program 23A of the embodiment may perform processing by calling required modules in predetermined order and timing among program modules provided as a part of the system program. That is, application program 23A of the embodiment is sometimes performed in cooperation with system program 230 including the OS.

Alternatively, in information processing device 20, a part or all of the functions provided by execution of application program 23A may be implemented as a dedicated hardware circuit, for example, an application specific integrated circuit (ASIC) or a field programmable gate array (FPGA).

Figure 3:
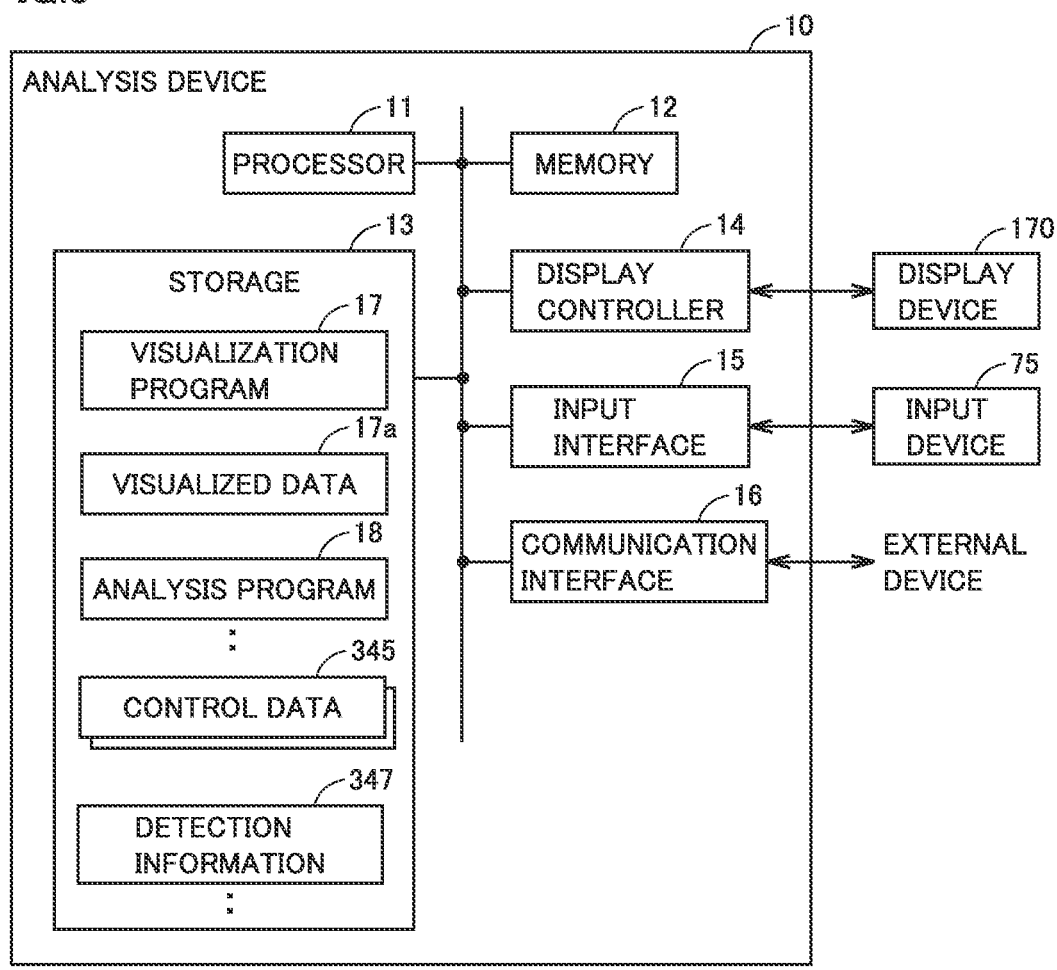
FIG. 3 is a schematic diagram illustrating an example of a hardware configuration of an analysis device 10 of the embodiment.

FIG. 3 is a schematic diagram illustrating an example of a hardware configuration of analysis device 10 of the embodiment. As illustrated in FIG. 3, analysis device 10 typically has a structure according to a general-purpose computer architecture.

Analysis device 10 includes a processor 11 such as a CPU or an MPU, a memory 12, a storage 13, a display controller 14, an input interface 15, and a communication interface 16. These units are data-communicably connected to each other through a bus.

Processor 11 reads various programs from storage 13, deploys the various programs on memory 12, and performs the instructions of the various programs, thereby implementing various pieces of processing of the embodiment.

Memory 12 is typically a volatile storage device such as a DRAM, and stores the program and the like read from storage 13.

Storage 13 is typically a non-volatile storage device such as a hard disk drive that non-transiently stores the program. Storage 13 stores control data 345 for each process Pr transferred from control device 30 and detection information 347 transferred from information processing device 20, and stores visualization program 17 and analysis program 18 that are performed by processor 11. Processor 11 performs analysis program 18 to perform analysis processing on control data 345 and detection information 347. Processor 11 performs visualization program 17 to generate visualized data 17a visualizing the result of the analysis processing of detection information 347. Display controller 14 controls display device 170 to display the image (flow line chart, moving image, and the like) based on visualized data 17a on the display.

Input interface 15 mediates data transmission between processor 11 and an input device 75 such as a keyboard, a mouse, a touch panel, or a dedicated console. That is, input interface 15 receives an operation instruction given by the user operating input device 75.

Communication interface 16 mediates the data transmission between processor 11 and the external device (for example, information processing device 20 and control device 30). Communication interface 16 typically includes Ethernet (registered trademark) or a universal serial bus (USB).

Figure 4:
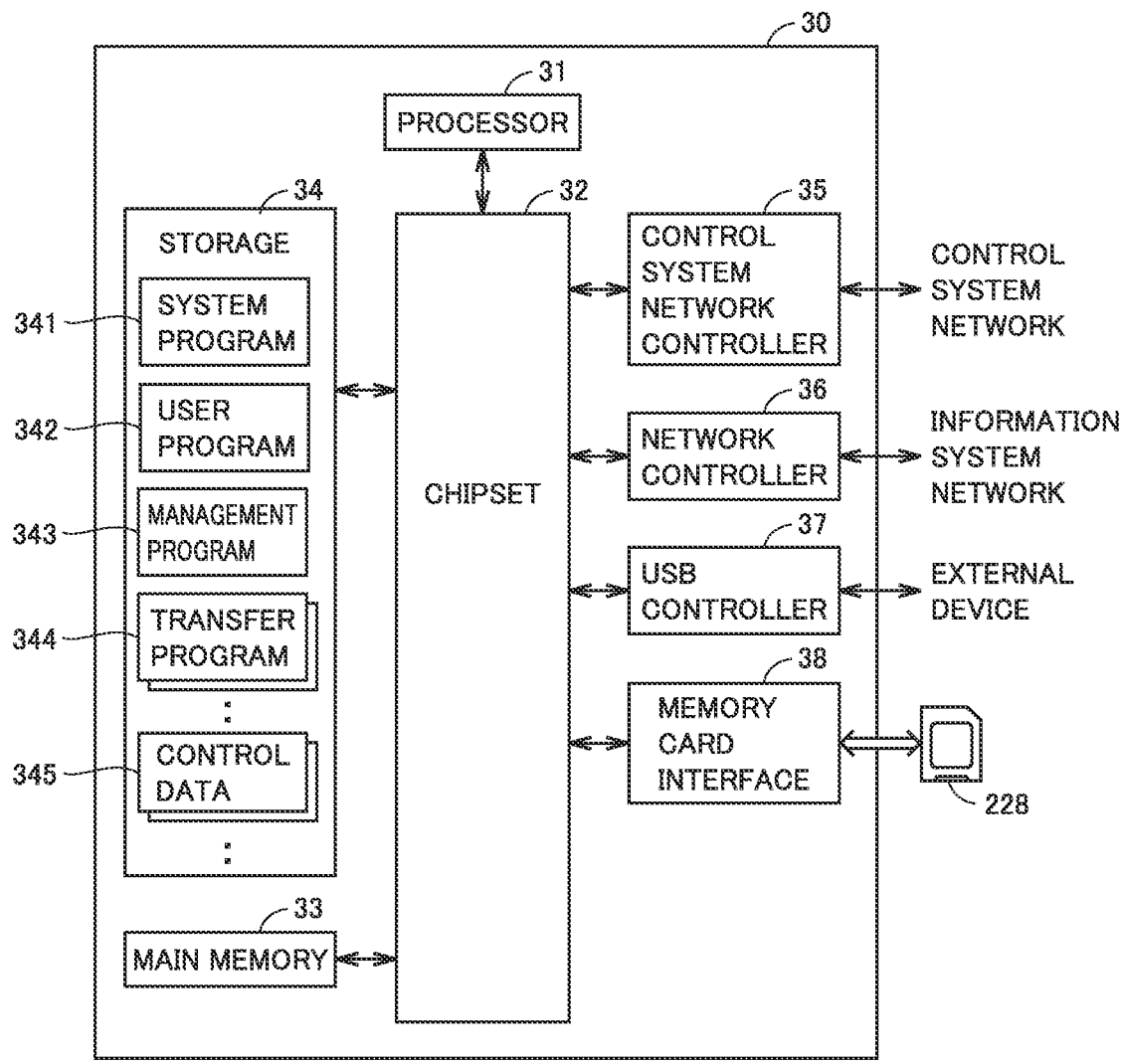
FIG. 4 is a block diagram illustrating an example of a hardware configuration of a control device 30 of the embodiment.

FIG. 4 is a block diagram illustrating an example of a hardware configuration of control device 30 of the embodiment. As illustrated in FIG. 4, control device 30 includes a processor 31 such as a CPU or an MPU, a chipset 32, a main memory 33, a storage 34, a control system network controller 35, an information system network controller 36, a USB controller 37, and a memory card interface 38.

Processor 31 reads various programs stored in storage 34, deploys the various programs in main memory 33, and performs the various programs, thereby implementing the control arithmetic operation controlling the control target. Chipset 32 controls the data transmission and the like between processor 31 and each component.

Storage 34 stores a system program 341 implementing basic processing, a user program 342 implementing control arithmetic operation, a management program 343 managing time synchronization by communicating with a time synchronization server (not illustrated), a transfer program 344, and control data 345. User program 342 is periodically performed based on the time synchronization, so that the command controlling machine 40 is calculated based on the state value detected from machine 40. The state value and the control command that are periodically acquired in this manner are stored as control data 345. Management program 343 may be a part of user program 342.

Control system network controller 35 transfers the control command from control device 30 to machine 40 through the control system network, and receives the state value transferred from machine 40.

Information system network controller 36 controls the data exchange between control device 30 and the external device (for example, analysis device 10 and information processing device 20) through the information system network.

USB controller 37 controls the data exchange with the external device (for example, a support device) through USB connection.

Memory card interface 38 is configured such that the external device such as a memory card 228 is detachably attached, and memory card interface 38 can write the data in memory card 228 and read various data (user programs, trace data, and the like) from memory card 228.

C. Image and Flow Line Information of Workplace

Figure 5:
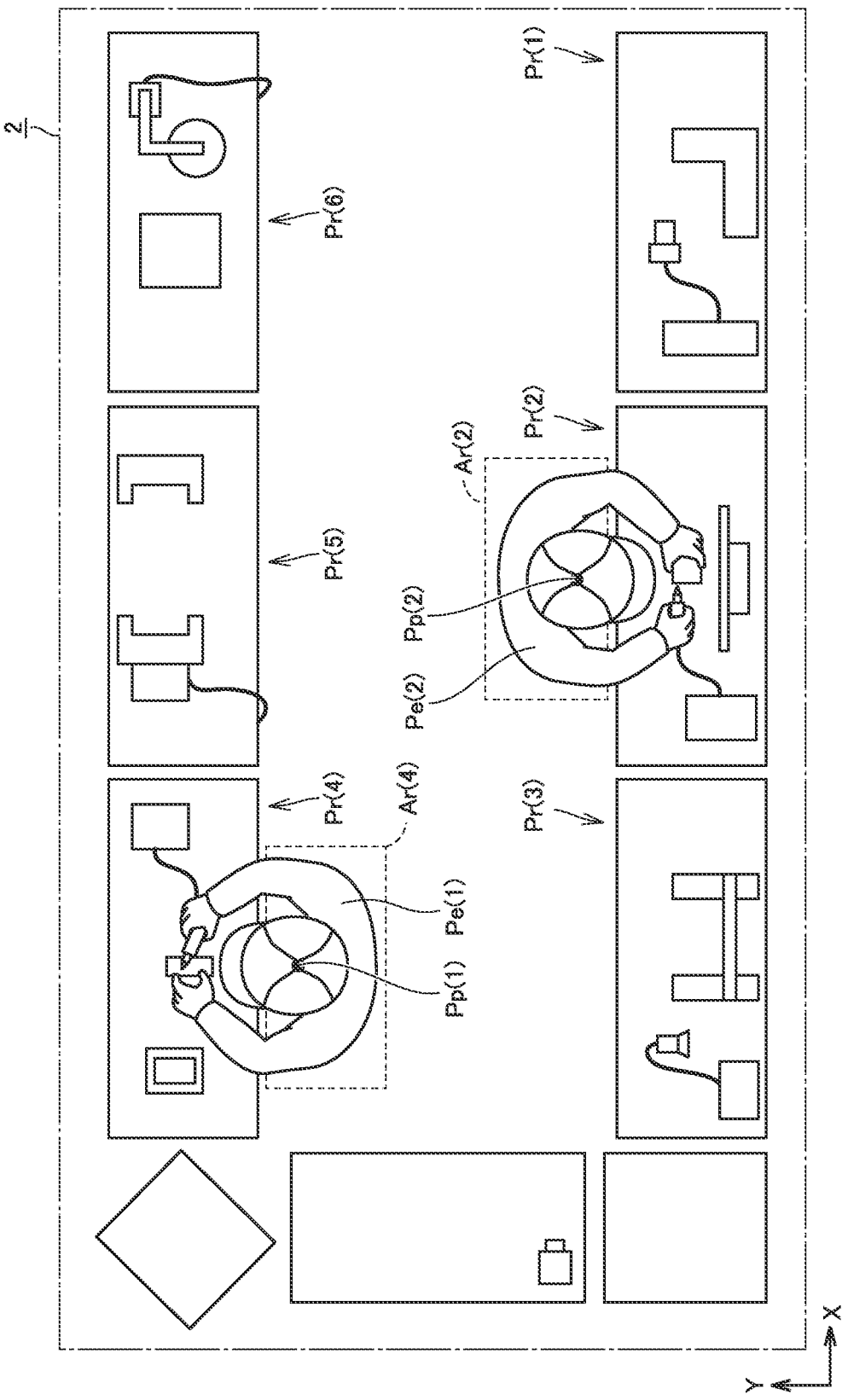
FIG. 5 is a view illustrating an example of an image of the embodiment.

FIG. 5 is a view illustrating an example of an image of the embodiment. The image in FIG. 5 illustrates a frame of the moving image obtained by camera 50 capturing the image of workplace 2 including five processes Pr. As illustrated in FIG. 5, each frame of the moving image includes the image of workplace 2 and the image of a worker Pe when the worker exists in workplace 2. Each frame of the moving image is associated with the imaging time specified using a time synchronization server (not illustrated).

In workplace 2, a cell production method is adopted. The cell production method is a production method in which one or a small number of workers complete assembly of products on a line called a cell in which parts (workpieces) and machines 40 are disposed in a U-shape. In FIG. 5, for each of six processes Pr(1) to Pr(6), monitoring area Ar is set as a predetermined work area corresponding to a place where worker Pe is located to work. Monitoring area Ar constitutes a partial area in the frame of the moving image. For example, FIG. 5 illustrates a monitoring area Ar(2) of process Pr(2) and a monitoring area Ar(4) corresponding to process Pr(4). For example, monitoring area Ar is a rectangle, and is defined by coordinates of four vertices.

Processor 21 of information processing device 20 scans the frame image captured by camera 50 based on a predetermined partial image, namely, a partial image representing the hat. Processor 21 detects a position Pp at which worker Pe exists in workplace 2 by detecting the coordinate position of the partial image in the frame based on a scanning result. More specifically, processor 21 detects a center of the partial image of the hat as position Pp of worker Pe. In the example of FIG. 5, positions Pp(1), Pp(2) of workers P (1), Pe(2) are detected by processor 21.

Processor 21 determines whether worker Pe exists in monitoring area Ar set for each process Pr at the imaging time of each frame. Specifically, processor 21 determines that worker Pe exists in monitoring area Ar according to position Pp of worker Pe included in monitoring area Ar.

For each process Pr, processor 21 specifies a plurality of consecutive frames in time series in which it is determined that worker Pe exists in monitoring area Ar corresponding to process Pr from the moving image. Processor 21 produces a record including the process ID identifying the process Pr for the plurality of specified frames. The record further includes a set of an IN time and an OUT time indicating the stay time. Specifically, processor 21 determines the imaging time of the first frame among the plurality of specified frames as the IN time, and determines the imaging time of the last frame among the specified frames as the OUT time. The set of the determined IN time and OUT time indicates the stay time that is time of a length from the IN time to the OUT time. Processor 21 generates flow line information 70 including the record of each process Pr produced in this way.

(c1. Specific Example of Flow Line Information 70)

Figure 6:
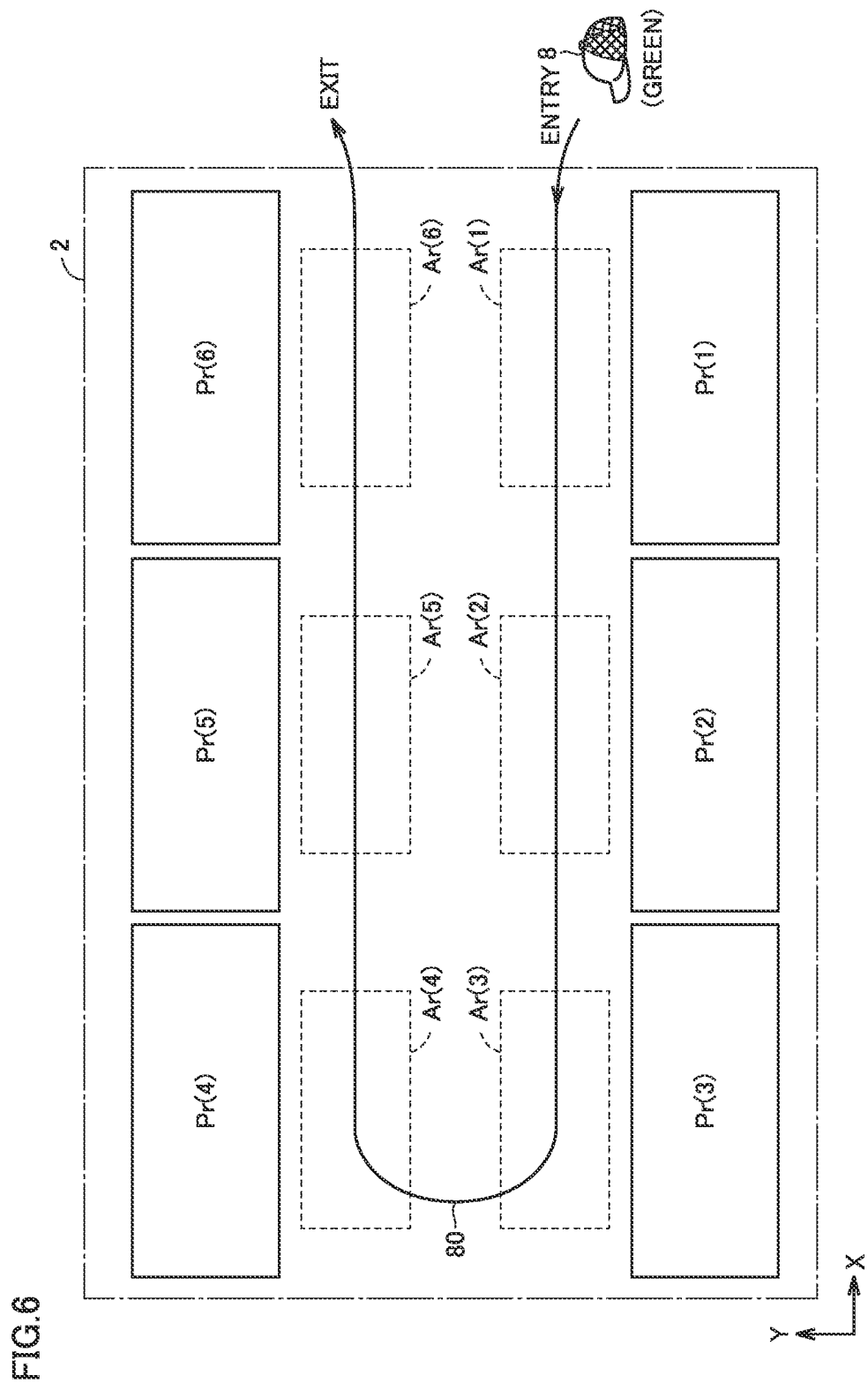
FIG. 6 is a view schematically illustrating an example of trajectory information 80 about a worker in a workplace 2.

FIG. 6 is a view schematically illustrating an example of trajectory information 80 about the worker in workplace 2. FIG. 7 is a view illustrating an example of flow line information 70 acquired from trajectory information 80 in FIG. 6. For example, trajectory information 80 acquired when worker Pe wearing green hat 8 moves through processes Pr(1) to Pr(6) in this order from the entry to the exit of workplace 2 is illustrated in FIG. 6. As illustrated in FIG. 7, flow line information 70 acquired from trajectory information 80 in FIG. 6 includes the color ID (green: G) indicating the color type of hat 8 worn by worker Pe, the worker ID ("124") corresponding to the color type, and the record corresponding to each of processes Pr(1) to Pr(6). Each record includes the set of IN time and OUT time indicating the stay time of worker Pe in monitoring area Ar of corresponding process Pr.

Figure 8:
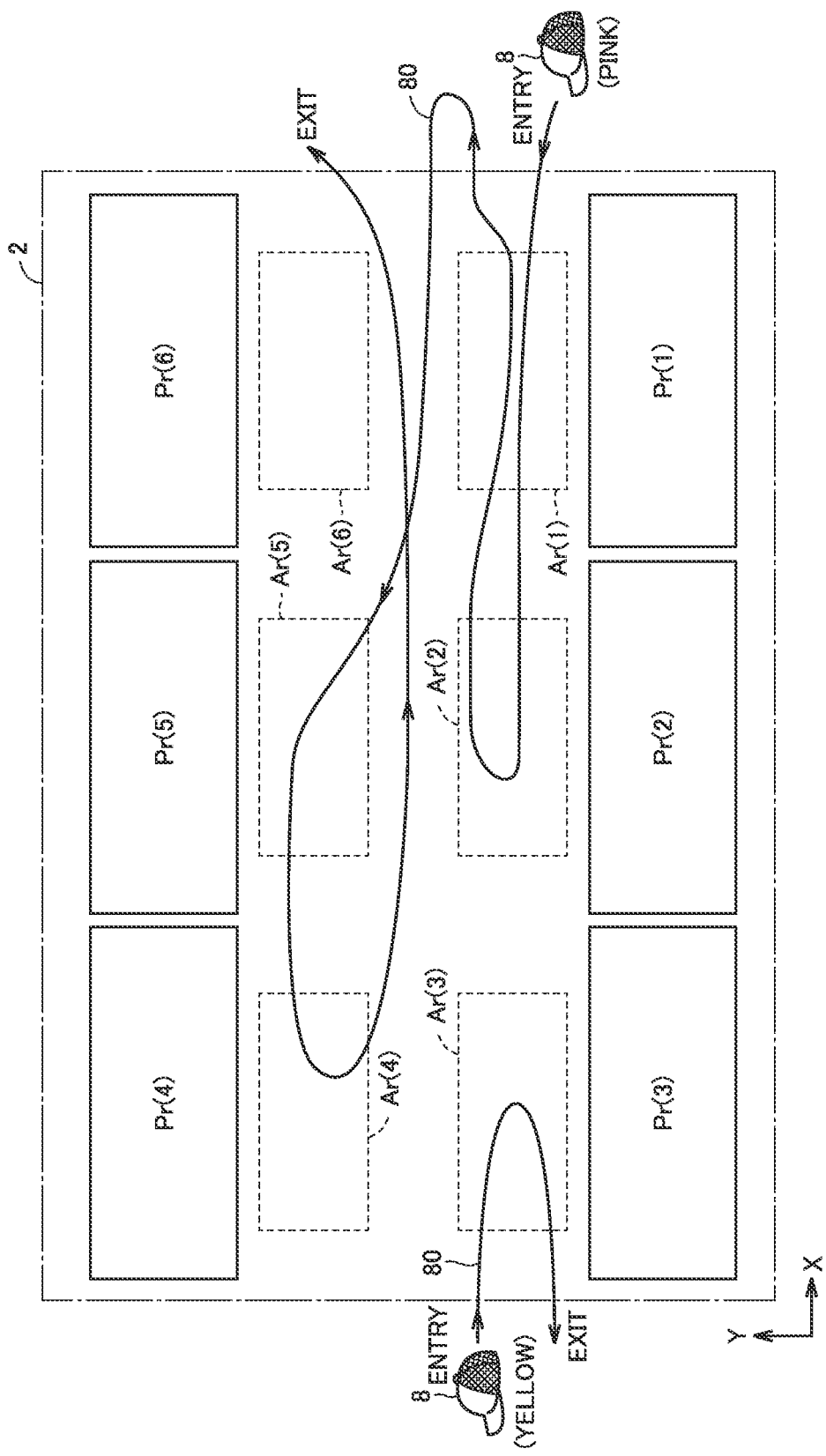
FIG. 8 is a view schematically illustrating another example of the trajectory information 80 of the worker in the workplace 2.

The color type of hat 8 may be varied based on a skill level for a role or work of worker Pe. For example, this role includes a manager of workplace 2 and a work leader, and the skill level includes a skilled person and a beginner. FIG. 8 is a view schematically illustrating another example of trajectory information 80 of the worker in workplace 2. FIGS. 9 and 10 are diagrams illustrating examples of flow line information 70 acquired from trajectory information 80 in FIG. 8. In FIG. 8, for example, trajectory information 80 acquired when the worker enters workplace 2, moves process Pr(1), process Pr(2), process Pr(1), process Pr(5), and process Pr(4) in this order, and then exits is illustrated for worker Pe who is a beginner wearing pink hat 8. FIG. 9 illustrates an example of flow line information 70 acquired based on trajectory information 80. Trajectory line information 70 in FIG. 9 indicates that the work returns from process Pr(2) to process Pr(1). Based on such traffic line information 70, for example, analysis device 10 can estimate that operator Pe has performed rework for a beginner.

In FIG. 8, for example, trajectory information 80 indicating that worker Pe who is a leader wearing yellow hat 8 enters workplace 2, is in monitoring area Ar (3) of process Pr(3), and then exits is acquired. FIG. 10 illustrates an example of flow line information 70 acquired based on trajectory information 80. Flow line information 70 in FIG. 10 indicates a relatively long stay time in process Pr(3). Based on such flow line information 70, for example, analysis device 10 estimates that the work instruction has been performed by worker Pe corresponding to the leader in process Pr(3).

D. Functional Configuration of Information Processing Device

Figure 11:
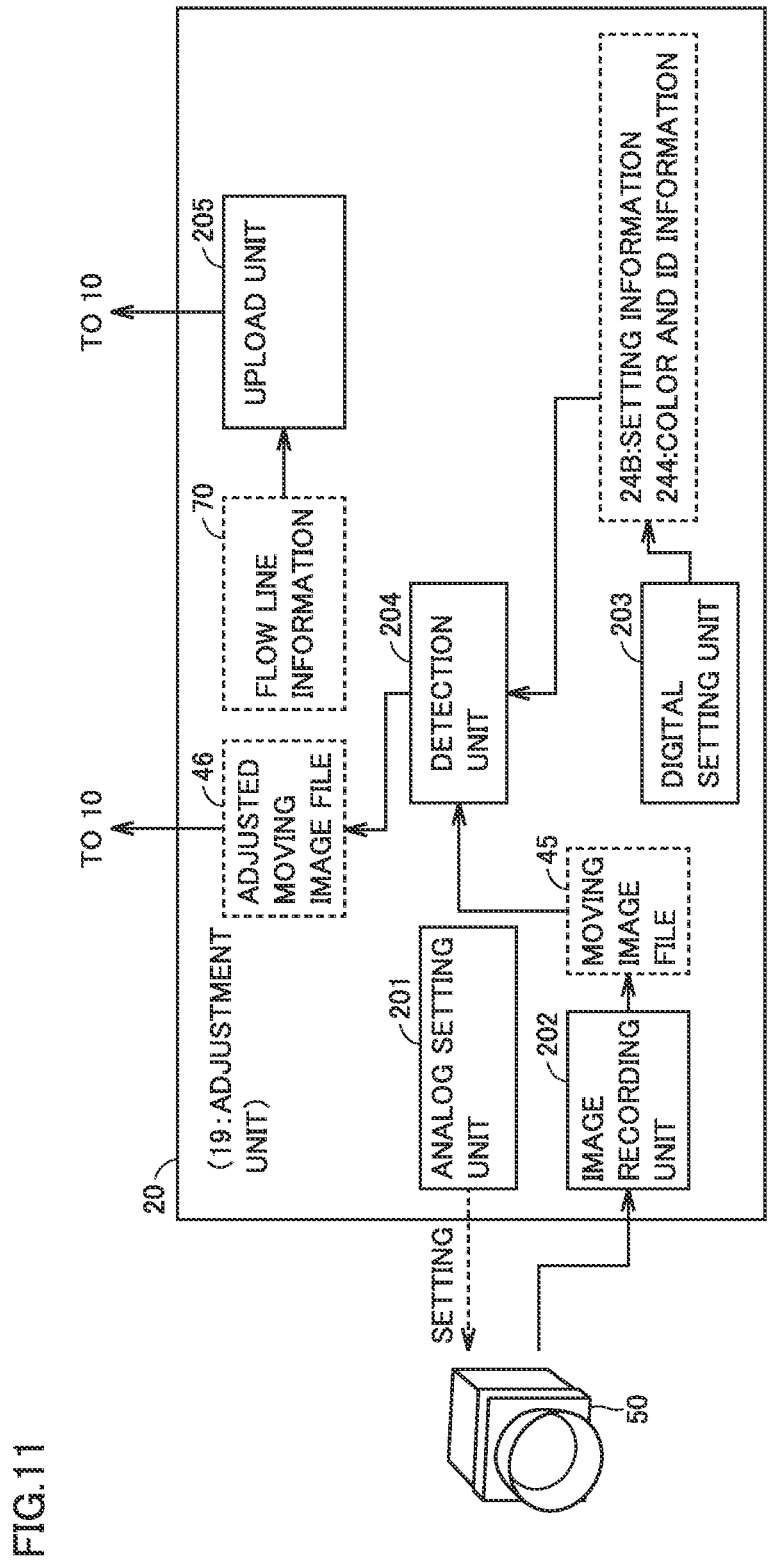
FIG. 11 is a view illustrating an example of a module configuration of the information processing device of the embodiment.

FIG. 11 is a view illustrating an example of a module configuration of the information processing device of the embodiment. As illustrated in FIG. 11, information processing device 20 includes an analog setting unit 201 and a digital setting unit 203 that are implemented by executing setting program 231, an image recording unit 202 implemented by executing image acquisition program 233, a detection unit 204 implemented by executing flow line detection program 236 including worker identification program 235 and color detection program 234, and an upload unit 205 implemented by executing transfer program 237.

Analog setting unit 201 receives a user operation on information processing device 20 and performs a setting regarding imaging on camera 50 according to the received user operation. Digital setting unit 203 receives the user operation on information processing device 20, and acquires and stores gamma value 4G and information 24B according to the received user operation. Digital setting unit 203 may be configured to acquire and store color and ID information 244 based on the received user operation.

Image recording unit 202 is an example of the "image acquisition unit". Image recording unit 202 stores the images (moving images) output in time series from camera 50 in storage 23 as moving image file 45 in a file format. Detection unit 204 constitutes a "partial image detection unit" that detects the partial image of hat 8 from the captured image, a "color detection unit", an "identification unit" of the worker, and a "position information acquisition unit". The "position information acquisition unit" can constitute a "first information acquisition unit" that acquires trajectory information 80 constituted by the detection position and time of the partial image and a "second information acquisition unit" that acquires flow line information 70 based on track information 80. Detection unit 204 processes moving image file 45 using information 24B and color and ID information 244 to identify the worker from the color type of hat 8 of the worker, and acquires trajectory information 80 and flow line information 70 based on the tracking.

Moving image file 45 is transferred to analysis device 10, and flow line information 70 associated with moving image file 45 is transferred to analysis device 10 by upload unit 205.

E. Flowchart

Figure 12:
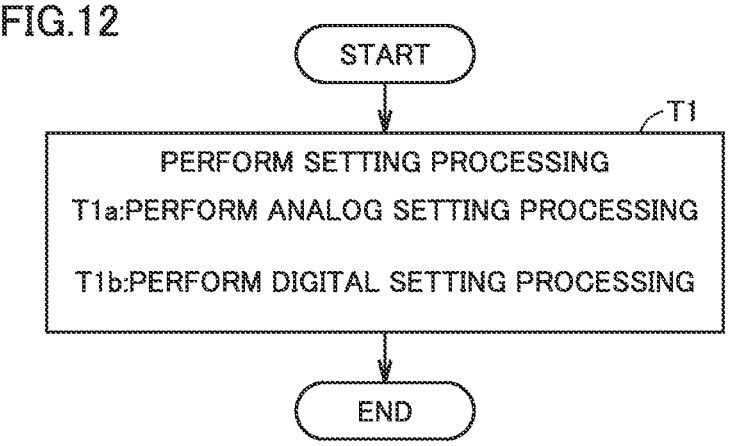
FIG. 12 is a flowchart illustrating setting processing of the embodiment.
Figure 13:
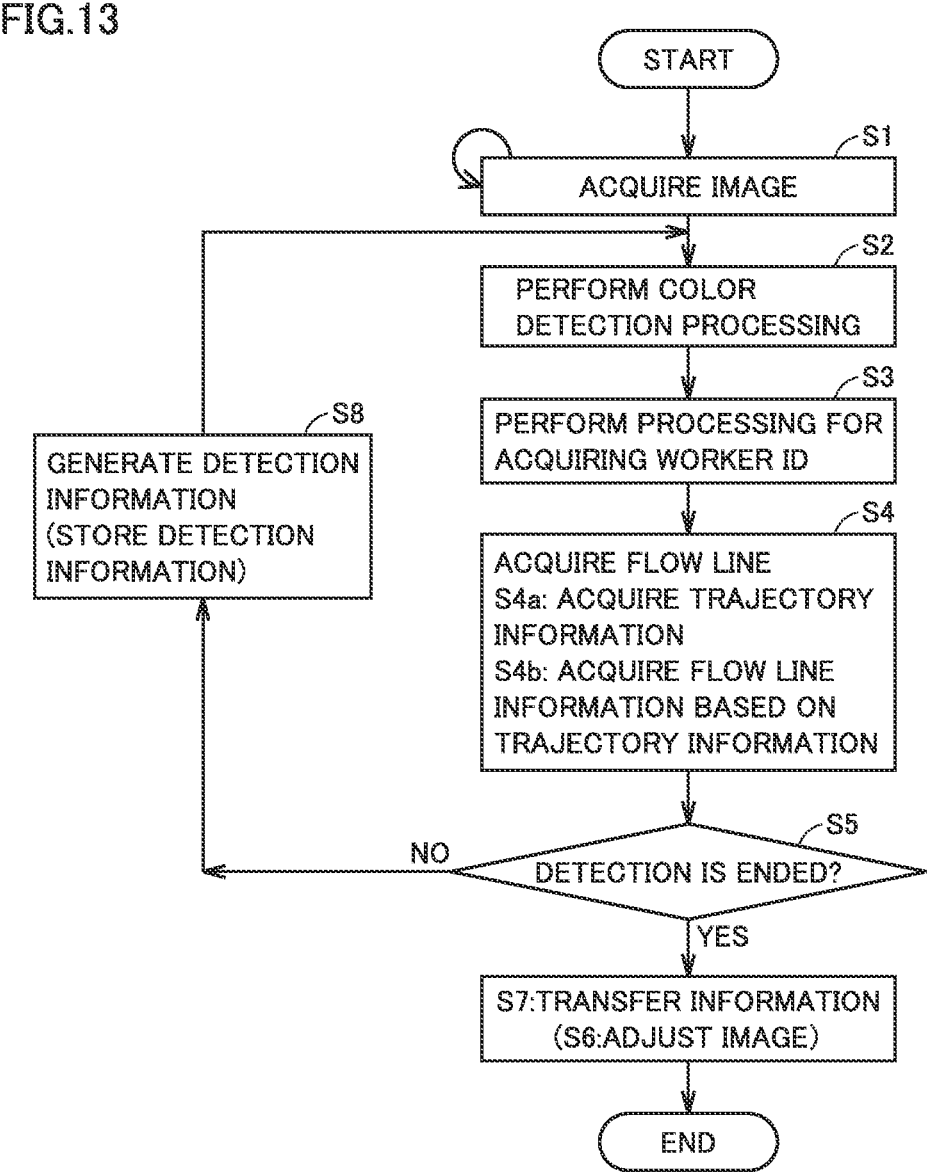
FIG. 13 is a flowchart illustrating detection processing of the embodiment.

FIG. 12 is a flowchart illustrating setting processing of the embodiment. FIG. 13 is a flowchart illustrating detection processing of the embodiment. In FIG. 12, processor 21 performs setting processing (step T1). In the setting processing, processor 21 performs analog setting processing (step T1*a*) as analog setting unit 201 and digital setting processing (step T1*b*) as digital setting unit 203. In the analog setting processing, white balance adjustment and gain adjustment described later are performed, whereby setting regarding the imaging is performed on camera 50. The setting of mask area 28 described later and monitoring area Ar described above, the setting of gamma value 4G described later, and the setting of color distribution information 241 are performed in the digital setting process. Gamma value 4G and information 24B (color distribution information 241, mask information 242, and monitoring area information 243) are stored in storage 23 by digital setting processing. After the setting processing in step T1 is performed, the detection processing in FIG. 13 is performed.

In FIG. 13, processor 21 performs image acquisition processing (step S1). Specifically, processor 21 receives the moving image output from camera 50 as image recording unit 202 and stores the received moving image as moving image file 45. Such reception and storage of the moving image are repeatedly performed in synchronization with the output of the image from camera 50. Moving image file 45 has a predetermined size.

Processor 21 performs color detection processing (step S2). Specifically, processor 21 scans the frame image of moving image file 45 with a previously-registered pattern image, and detects a partial image having a feature amount matched with the pattern image based on a scanning result, namely, a degree of similarity to the feature amount of the pattern image is greater than or equal to a certain level as the partial image of hat 8, as the "partial image detection unit" of detection unit 204. Such the pattern image has at least one feature amount (shape such as top of head, flange shape, and size when hat 8 is imaged by camera 50) of hat 8.

Figure 14:
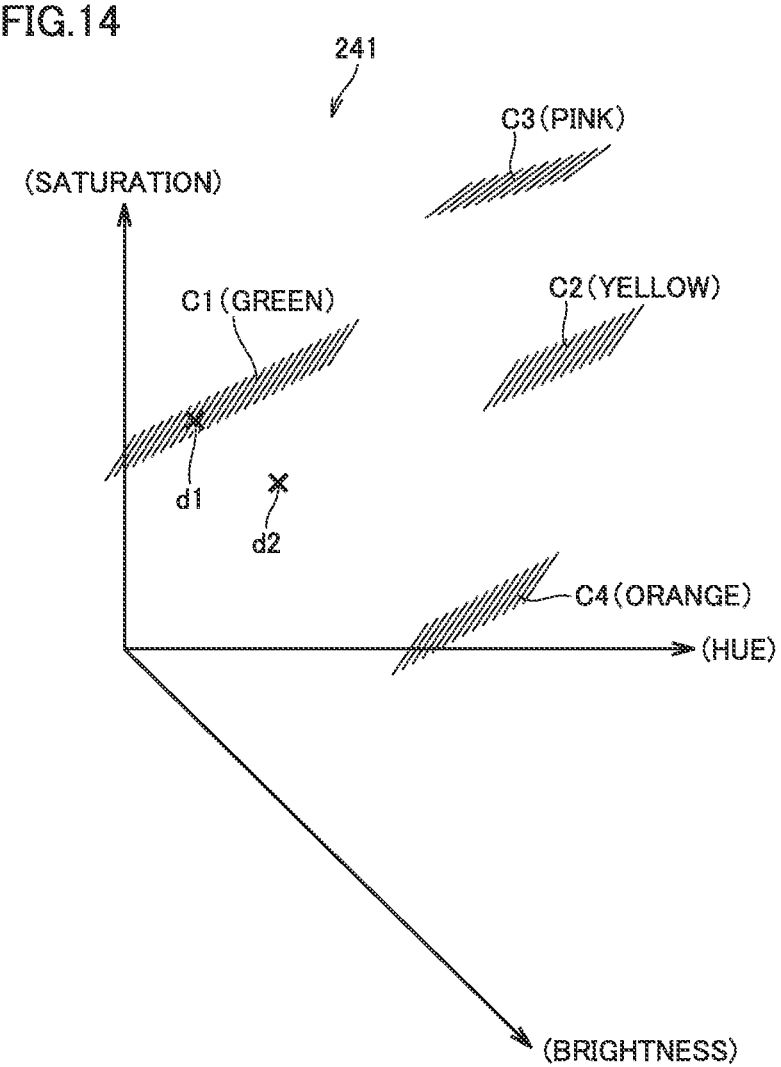
FIG. 14 is a view illustrating an example of color distribution information 241 of the embodiment.

Processor 21 detects the color type of the detected partial image using color distribution information 241 indicated using a color attribute (hue, saturation, lightness). Color distribution information 241 constitutes reference information that is referred to by processor 21 to determine the color type of hat 8. FIG. 14 is a view illustrating an example of color distribution information 241 of the embodiment. In FIG. 14, a value (coordinate value) of a color distribution is indicated for each of different types of colors in a color space corresponding to a three-dimensional coordinate system in which a coordinate axis assigned with magnitude of the hue as a parameter, a coordinate axis assigned with the saturation as a parameter, and a coordinate axis assigned with the brightness as a parameter are orthogonal to each other.

For example, when green, yellow, pink, and orange exist as the types of colors applied to hat 8, in the coordinate system of FIG. 14, the ranges of these colors are indicated by hatching as the distribution of attribute values of (hue, saturation, lightness), namely, the distribution of the coordinate values corresponding to the attribute values. In addition, color distributions C1, C2, C3, C4 indicated by hatching are illustrated for green, yellow, pink, and orange, respectively. A method for acquiring such color distribution information 241 will be described later.

Processor 21 calculates the value of a color attribute (hue, saturation, lightness) owned by the partial image of hat 8 detected from the frame image, and converts the calculated value into a coordinate value in the coordinate system. Processor 21 collates the converted coordinate values with a plurality of coordinate values constituting the distribution for each of color distributions C1, C2, C3, C4, and, based on a result of the collation, specifies which color distribution the converted coordinate value corresponds to. In FIG. 14, for example, color distribution C1 is specified for a converted coordinate value d1, and processor 21 determines that the color type of hat 8 is "green" corresponding to specified color distribution C1. On the other hand, when a coordinate value d2 is calculated from the partial image, as illustrated in FIG. 14, coordinate value d2 does not correspond to any color distribution, namely, the color type is not determined. The values of "hue", "saturation", and "brightness" constituting the color attribute of the image are calculated by processor 21 according to a predetermined arithmetic expression based on the pixel values (for example, RGB values) constituting the partial image of hat 8. As described above, when the attribute value of the color detected from the partial image is specified to fall within the color range defined by color distribution information 241, processor 21 can determine that the worker exists in workplace 2.

In FIG. 14, one color distribution is set for various colors, but a plurality of color distributions corresponding to color changes may be set.

Processor 21 performs processing for acquiring the worker ID and flow line information 70 (step S3) as detection unit 204. Specifically, processor 21 acquires the worker ID corresponding to the color type by searching color and ID information 244 based on the detected color type. Furthermore, processor 21 tracks the movement of the partial image of hat 8 over consecutive the frame images of moving image file 45, thereby generating and storing trajectory information 80 configured of the plurality of elements in time series (ti,(xi,yi),Di) (step S4*a*).

Figure 15:
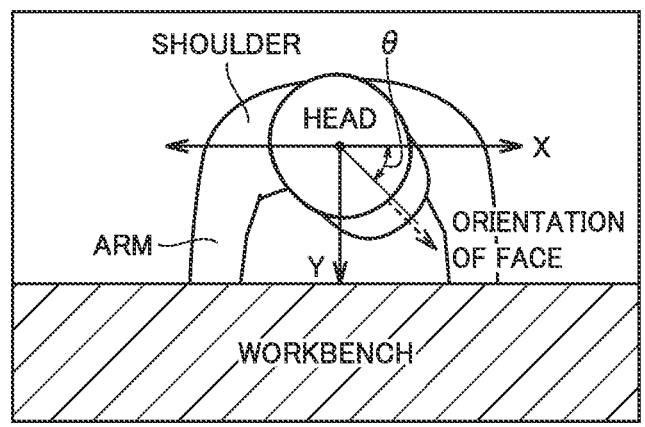
FIG. 15 is a view schematically illustrating a method for detecting an orientation Di of the embodiment.

A method for detecting orientation Di constituting the element (ti,(xi,yi),Di) is illustrated in FIG. 15. FIG. 15 is a view schematically illustrating a method for detecting orientation Di of the embodiment. FIG. 15 is the image obtained by imaging worker Pe from the vertically downward direction by one camera 50, and includes the partial image of hat 8 worn by the worker and the image around the partial image. When analyzing the partial image of hat 8, processor 21 detects angle θ formed by the straight line connecting the top point of hat 8 and the tip of the brim with the virtual axis extending in the X-axis direction at the top point, and determines detection angle θ as orientation Di of hat 8. The method for detecting orientation Di is not limited thereto.

Processor 21 acquires flow line information 70 based on trajectory information 80 as detector 204 (step S4*b*). Specifically, processor 21 compares the coordinate (xi,yi) of the elements (ti,(xi,yi),Di) constituting trajectory information 80 with the coordinates indicated by monitoring area information 243 of each process Pr, and processor 21 detects that worker Pe exists in monitoring area Ar at corresponding time ti when determining that the coordinate (xi,yi) indicates the position in monitoring area Ar based on the comparison result. When such time ti is detected for monitoring area Ar of each process Pr, the stay time indicated by the IN time to the OUT time of each process Pr constituting flow line information 70 is detected.

In the embodiment, the work time during which worker Pe performs the work is detected out of the stay time of worker Pe in process Pr. Specifically, worker Pe wears hat 8 such that the orientation of the tip of the brim of hat 8 coincides with the orientation of the front of the face, so that the orientation of the face of worker Pe can be indicated by orientation Di. Processor 21 detects the degree to which orientation Di of worker Pe staying in process Pr coincides with a predetermined orientation corresponding to the posture of the worker during the work. It is determined that time ti at which the detected degree of coincidence exceeds a predetermined value corresponds to the work time of worker Pe. In this manner, the work time among the staying times can be estimated (acquired) based on orientation Di. The subject that performs such the work time detection is not limited to information processing device 20, but may be analysis device 10.

Processor 21 determines whether the processing for detecting flow line information 70 ends based on, for example, the user operation (step S5). When determining not to end the detection processing (NO in step S5), processor 21 generates detection information 347 using the information (flow line information 70 and trajectory information 80 corresponding to moving image file 45) acquired in step S3 and step S4, and stores detection information 347 in storage 23 (step S8). Thereafter, for moving image file 45 acquired next, the pieces of processing of steps S3 to S5 are repeated in the same manner as described above.

When it is determined to end the detection processing (YES in step S5), processor 21 transfers the information (detection information 347 of storage 23) acquired in step S3 and step S4 to analysis device 10 as upload unit 205 based on the user operation on information processing device 20 (step S7). The information transferred from information processing device 20 to analysis device 10 in step S7 includes moving image file 45 and flow line information 70, and the transfer information can also include trajectory information 80.

Furthermore, when moving image file 45 is transferred in step S7, in step S6, processor 21 performs the gamma correction using gamma value 4G on the frame images constituting moving image file 45 as an adjustment unit 19. Thus, moving image file 45 (adjusted moving image file 46) including the frame image in which the brightness is adjusted is output. Aspects of this output include being transferred to analysis device 10 (step S7), being displayed on a display, or being stored in the storage.

Specifically, the image captured by camera 50 after the gain adjustment described above indicates a dark image as a whole as described later. Processor 21 adjusts (corrects) the image of moving image file 45 to be bright in step S6, and then transfers moving image file 45 in step S7. Thus, the image of moving image file 45 is displayed with appropriate brightness on display device 170 of analysis device 10.

The subject that performs the brightness adjustment of the image is not limited to information processing device 20, but may be analysis device 10. In this case, in step S7, gamma value 4G is transferred to analysis device 10, and analysis device 10 performs the gamma correction on each frame image of moving image file 45 transferred from information processing device 20 using gamma value 4G transferred from information processing device 20, and displays the corrected image on display device 170.

F. Output Example of Flow Line Information

Figure 16:
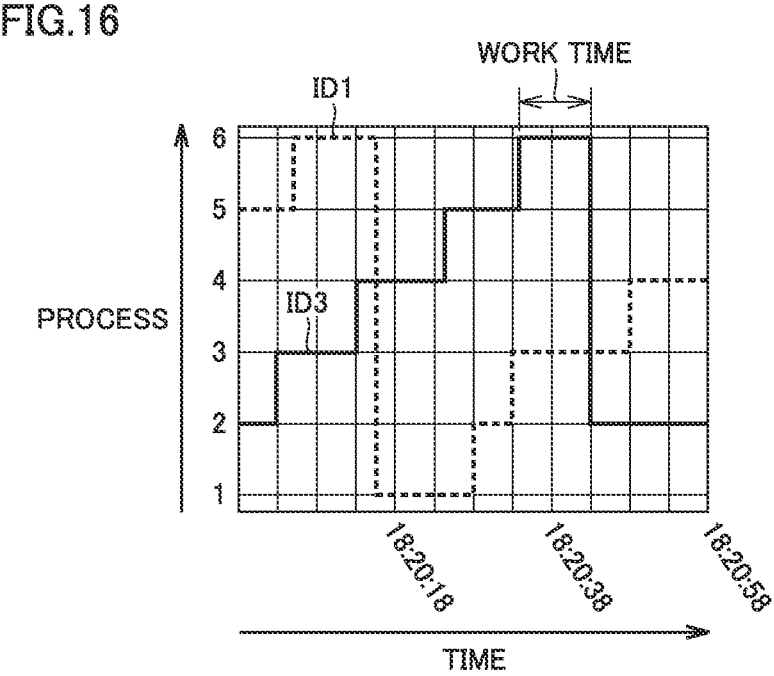
FIG. 16 is a view schematically illustrating a display example based on an analysis result of the flow line information 70 of the embodiment.
Figure 17:
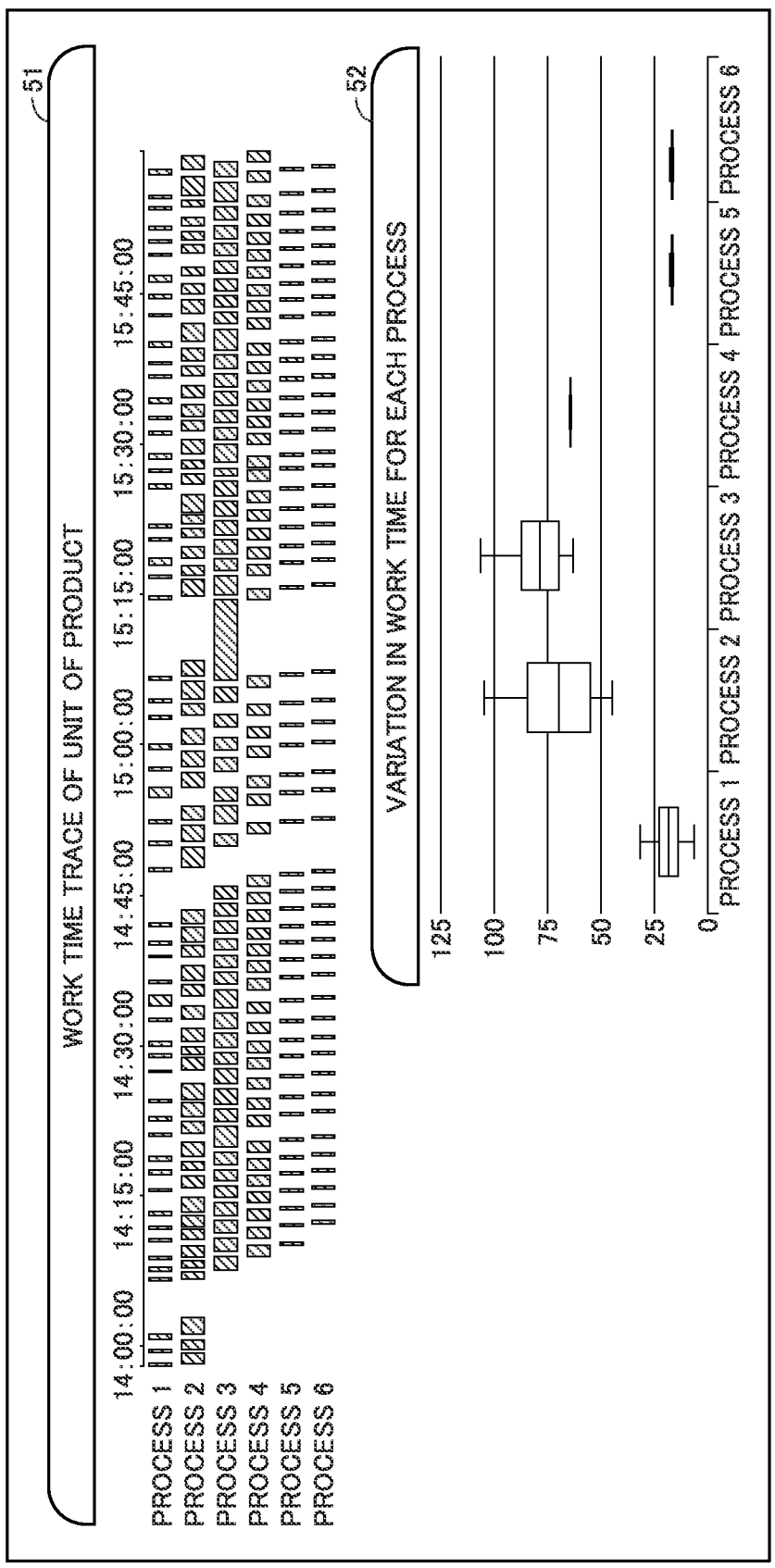
FIG. 17 is a view schematically illustrating a display example based on the analysis result of the flow line information 70 of the embodiment.

FIGS. 16 and 17 are views schematically illustrating a display example based on the analysis result of flow line information 70 of the embodiment. Display device 170 of analysis device 10 displays the image based on visualized data 17*a* acquired by the analysis processing of flow line information 70. In the flow line chart of FIG. 16 based on visualized data 17*a*, a horizontal axis represents time, and a vertical axis represents processes Pr(1) to Pr(6). FIG. 16 illustrates the flow line chart of a broken line based on flow line information 70 with the worker ID of "ID1" and the flow line chart of a solid line based on flow line information 70 with the worker ID of "ID3". The flow line chart illustrates the work time in each process Pr. In the traffic line chart, the stay time in each process Pr may be indicated instead of the work time.

In FIG. 17, a gantry chart 51 illustrating the time slot of the work time is illustrated for each of the plurality of processes Pr. Furthermore, FIG. 17 includes a box-and-whisker plot 52 illustrating a variation in work time for each of the plurality of processes Pr. The screen in FIG. 17 may include only one of gantry chart 51 and box-and-whisker plot 52.

G. Modifications

The following processing can be applied to the processing of information processing device 20 described above.
(g1. Mask Processing)

Because various things including production facilities are disposed in workplace 2, flow line information 70 also includes an error when these things are erroneously detected at the time of detecting trajectory information 80. In the embodiment, mask processing is performed in order to eliminate errors caused by these various pieces of information of things.

Specifically, the processing for acquiring flow line information 70 based on trajectory information 80 (step S4*b*) can be configured such that flow line information 70 is acquired by the mask processing using mask information 242.

FIGS. 18A and 18B are each a view illustrating an example of the area setting of the embodiment. The set area includes the work area corresponding to monitoring area Ar and the area where worker Pe does not work (hereinafter, referred to as mask area). In order to set these areas, a graphical user interface (GUI) through touch pad 27 is provided by digital setting unit 203. An example of the GUI is illustrated in FIGS. 18A and 18B.

FIG. 18A illustrates an example of the frame image before the area setting, FIG. 18B illustrates that monitoring area Ar(2) that is the work area is set in the frame image, and FIG. 18C illustrates that mask area 28 of the frame image is set. Processor 21 displays the image in which the partial images of monitoring area Ar and mask area 28 are set based on the user operation including a drag operation and a drop operation. Digital setting unit 203 sets the coordinates representing monitoring area Ar and mask area 28 FIG. 18B and FIG. 18C as monitoring area information 243 and mask information 242. Monitoring area information 243 and mask information 242 are represented using the coordinates of a range occupied by the partial images of monitoring area Ar and mask area 28 in the two-dimensional coordinate plane corresponding to the frame image.

In the color detection processing (step S2), processor 21 determines whether the element having the coordinates indicated by mask information 242, namely, coordinates $(x_i, y_i)$ corresponding to mask area 28 among the time-series elements $(t_i, (x_i, y_i), D_i)$ of trajectory information 80, and if so, processor 21 deletes the element from trajectory information 80. Processor 21 acquires flow line information 70 based on trajectory information 80 subjected to such the mask processing. As described above, flow line information 70 can be acquired from trajectory information 80 for the area excluding mask area 28 in the frame image, so that the above error can be eliminated from flow line information 70.

Furthermore, the mask processing using mask information 242 may be applied to the color detection processing including the scanning using the pattern image of the frame image and the detection of the color type (step S2) and the generation of trajectory information 80 by tracking (step S4a). Specifically, when detecting the partial image of hat 8 by scanning the frame image of moving image file 45 with the pattern image, processor 21 scans the area excluding the area corresponding to mask area 28 in the frame image with the pattern image. Thus, the color detection processing (step S2) is performed on the area of the frame image excluding mask area 28, so that the above error can be excluded from the result of the color detection. In addition, the range in which the partial image of hat 8 is tracked in the frame image can be limited to the area excluding the area corresponding to mask area 28. Thus, the above-described error can be prevented from being included in trajectory information 80 acquired by tracking.

(g2. Acquisition of Trajectory Information Using Optical Flow)

When tracking the movement of the partial image of hat 8, processor 21 may perform tracking by using an optical flow. Specifically, processor 21 calculates a difference (motion) between predetermined feature points of the partial images between the frame images as a vector, and complements a trajectory indicating the motion of the partial image between the frames using the calculated vector. Thus, trajectory information 80 indicating the trajectory that follows the movement of hat 8 that is a moving object can be acquired.

Figure 19A:
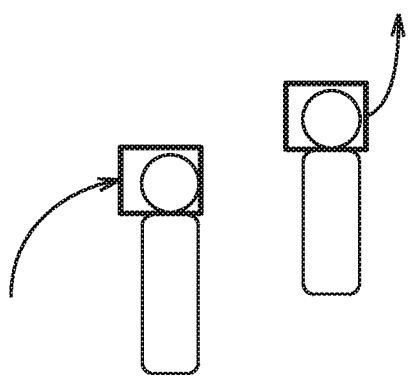
FIGS. 19A and 19B are each a view schematically illustrating an example of a trajectory complemented using an optical flow.
Figure 19B:
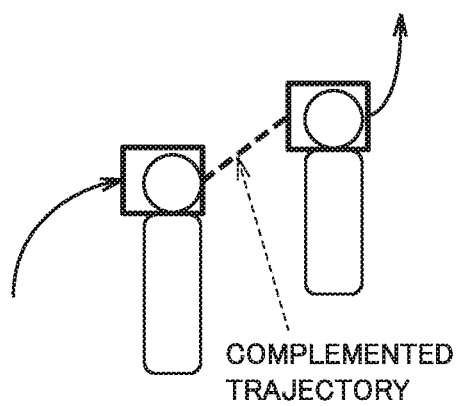

FIGS. 19A and 19B are each a view schematically illustrating an example of the trajectory complemented using the optical flow. FIG. 19A illustrates the trajectory before the complementation, and FIG. 19B illustrates the trajectory complemented with a broken line vector. In the optical flow, only feature points having the motion between the frames are extracted. Therefore, even when various objects are disposed in workplace 2, the feature points of the disposed objects are not detected as the motion between the frames in the optical flow. As a result, the error caused by these things can be prevented from being included in trajectory information 80.

(g3. Detection of Partial Image of Hat Using Height)

In the embodiment, processor 21 detects the partial image of hat 8 by scanning the frame image with the pattern image as the "partial image detection unit", and this detection processing may be configured to use the size of the partial image.

Specifically, in the frame image captured by camera 50 installed at a predetermined height from a floor surface of workplace 2, processor 21 can determine the height of hat 8 from the floor surface from the size of the partial image of hat 8. That is, the position of hat 8 indicates a certain height from the floor surface when hat 8 of the partial image is hat 8 worn by worker Pe, so that processor 21 can determine that the partial image is the image of hat 8 worn by worker Pe when the size that is one of the feature amounts of the partial image scanned by the pattern image indicates a predetermined size corresponding to the certain height.

Because camera 50 is installed at the predetermined height from the floor surface of workplace 2, the captured image includes hat 8 worn by the worker as the partial image having the size corresponding to the predetermined height. Processor 21 detects the partial image of hat 8 worn by the worker by scanning the captured image with the pattern image having the feature amount indicating the size. As described above, the feature amount of the pattern image can be used as information supporting the detection of the partial image of hat 8 worn by the worker from the captured image while distinguishing the partial image from other partial images (partial images of the workpiece and the production facility).

In addition, processor 21 calculates a height "hi" of hat 8 from the floor surface according to a predetermined arithmetic expression based on the size of the partial image of hat 8. Processor 21 acquires trajectory information 80 including a plurality of elements (ti,(xi,yi),di,hi) by adding height hi calculated by coordinates (xi,yi). In the analysis processing, the posture (standing posture, sitting posture) of worker Pe in process Pr can be determined based on elements (ti,(xi, yi),di,hi) constituting trajectory information 80.

In addition, when the color type detected for hat 8 indicates the predetermined type of hat 8 worn by the manager of workplace 2 and the work leader, the above-described work time may not be acquired for the worker wearing hat 8 of the predetermined color type.

H. Setting Processing

In the embodiment, the GUI through touch pad 27 is provided by each of analog setting unit 201 and digital setting unit 203. The GUI includes a GUI adjusting camera 50 and a GUI setting regarding the processing of the image from camera 50. The adjustment of camera 50 includes the white balance adjustment and the gain adjustment. The setting of the image processing includes the setting of the gamma value and the setting of the color distribution information.

(h1. White Balance Adjustment of Camera 50)

Figure 20:
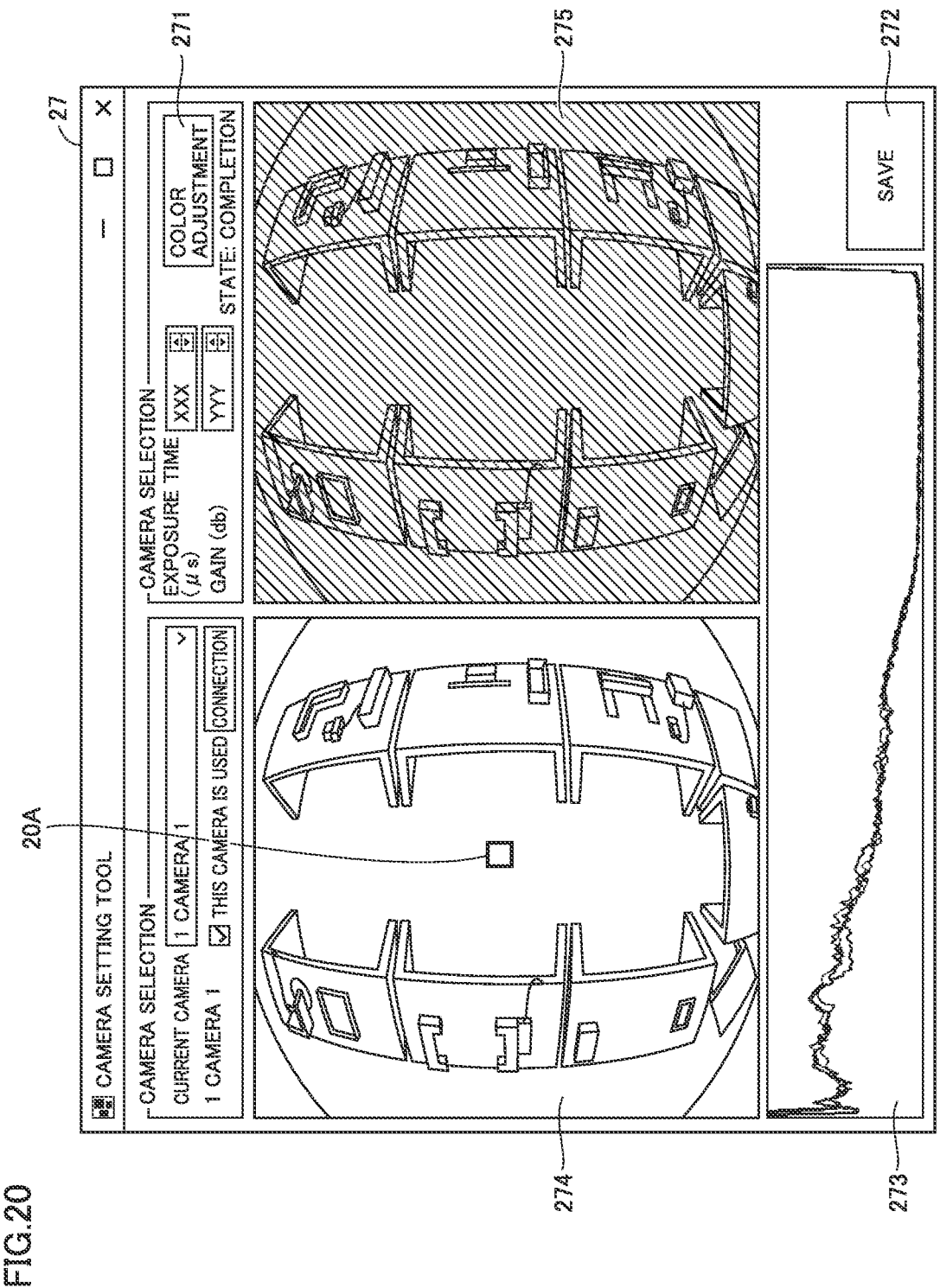
FIG. 20 is a view schematically illustrating an example of a GUI screen for white balance adjustment of the embodiment.

FIG. 20 is a view schematically illustrating an example of a GUI screen for the white balance adjustment of the embodiment. Camera 50 is designed to automatically perform the white balance adjustment. For example, camera 50 is designed to balance colors of the captured image (digital image) based on the reference. For the white balance adjustment, in the embodiment, a thing (for example, a gray card 20A) of a reference color serving as the reference is installed on the floor surface or the like of workplace 2 that is a visual field of camera 50. Preferably, card 20A is installed immediately below a lens of camera 50. A captured image 274 from camera 50 before the white balance adjustment is displayed on the left side in FIG. 20, and a captured image 275 after the white balance adjustment is displayed on the right side. When the user performs the operation selecting the area inside the partial image of gray card 20A in image 274 and performs a click operation of an adjustment start button 271, analog setting unit 201 receives the user operation and outputs a command to camera 50 to perform the white balance using the color value of the image of the designated area as the reference. Camera 50 performs the white balance adjustment according to the command, and analog setting unit 201 acquires adjusted captured image 275 from camera 50 and displays adjusted captured image 275. Furthermore, an area 273 of display 7a of touch pad 27 indicates a color spectrum that is a distribution of each component of the RGB values of the pixels of image 275 after the white balance adjustment. When the user operates a button 272, analog setting unit 201 receives the operation and transmits a white balance adjustment completion command to camera 50 according to the received operation content.

(h2. Gain Adjustment of Camera 50)

When what is called overexposure is generated in the captured image from camera 50, detection accuracy of the partial image of hat 8 decreases. When an extremely high illuminance portion (extremely bright portion) exists in the field of view of camera 50, what is called an overexposure phenomenon is generated in the extremely bright portion, and the visibility of the image is reduced. In the embodiment, when hat 8 has a bright and vivid color, the partial image of hat 8 may cause the overexposure.

Accordingly, analog setting unit 201 adjusts an exposure amount of camera 50 so as to obtain the brightness of the image without the overexposure. More specifically, the voltage (gain) driving an iris of camera 50 is changed to change the opening area, namely, the exposure amount of a diaphragm of camera 50, thereby changing the brightness of the image captured by camera 50.

Figure 21:
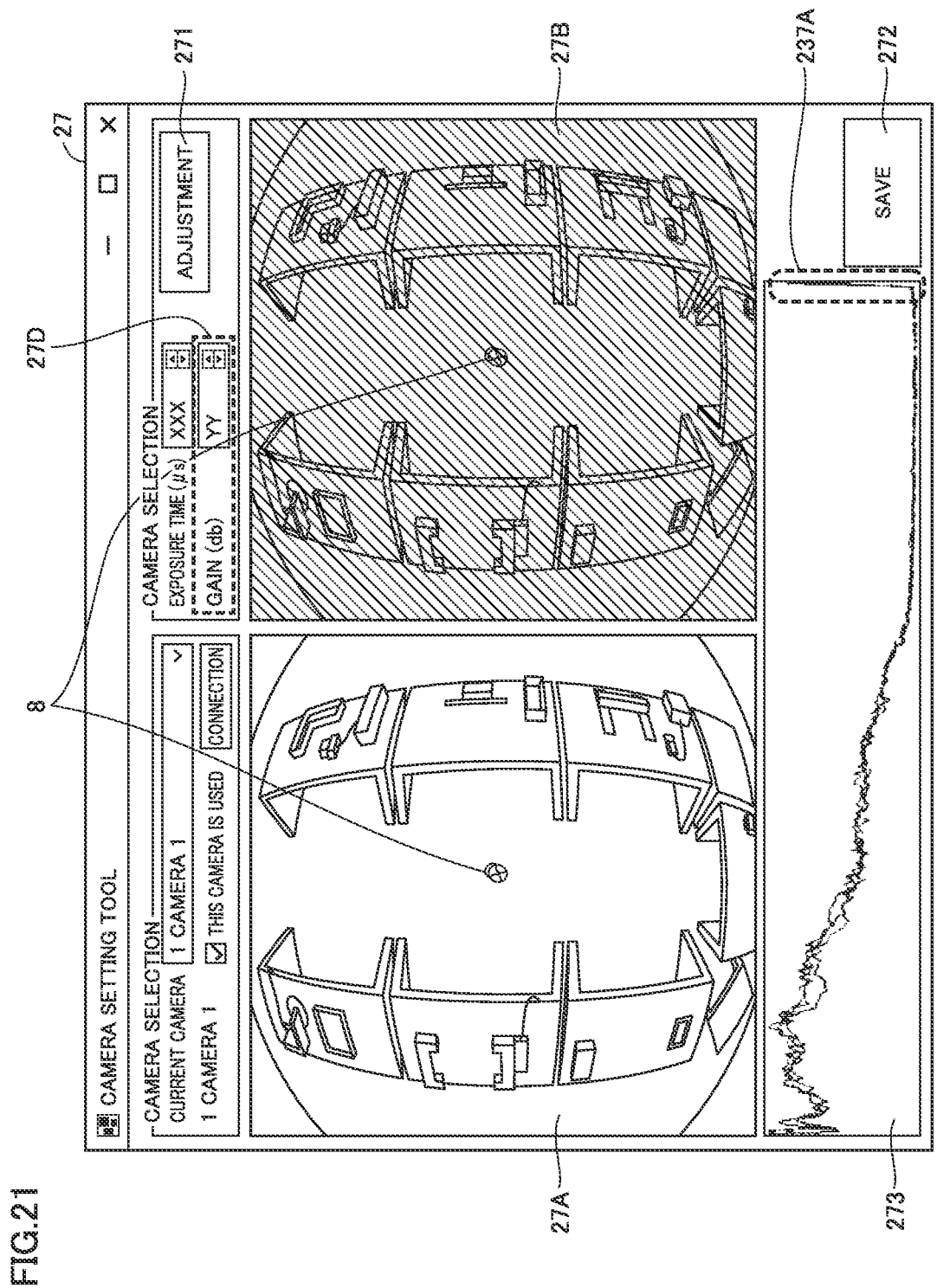
FIG. 21 is a view schematically illustrating an example of a GUI screen for gain adjustment of the embodiment.

FIG. 21 is a view schematically illustrating an example of the GUI screen for gain adjustment of the embodiment. A captured image 27A from camera 50 before the gain adjustment is displayed on the left side in FIG. 21, and an image 27B from camera 50 after the gain adjustment is displayed on the right side. In these images, for example, orange hat 8 or the worker wearing hat 8 is disposed immediately below the lens of camera 50. In image 27A, the partial image of hat 8 is the image of the "overexposure".

When the user operates button 271, analog setting unit 201 receives the user operation and outputs a gain adjustment command to camera 50 based on the received user operation. Camera 50 adjusts the gain in response to the command, and outputs adjusted captured image 27B. An icon 27D on the screen in FIG. 21 indicates the gain value corresponding to currently displayed image 27B.

The user repeatedly operates button 271 until the "orange" is visually recognized as the color without the overexposure, for example, substantially "black" in image 27B. Analog setting unit 201 outputs the gain adjustment command to camera 50 every time button 271 is operated. Thus, each time camera 50 receives the command, the adjusted (changed) gain is set, and image 27B indicates the image captured by camera 50 in which the adjusted gain is set in this manner.

When the user visually recognizes that the "orange" turns to the substantially "black" in image 27B, the user operates button 272. Analog setting unit 201 outputs the command completing the gain adjustment to camera 50 according to the operation of button 272. Thus, the gain with which the exposure amount is such that the overexposure is not generated in the captured image is determined, and the gain is set to camera 50.

When the "orange" becomes the substantially "black" in image 27B, image 27B visually indicates a dark image, and in the color spectrum of image 27B in area 273, the right end value (minimum value) indicated by a cursor 273A indicates substantially zero.

The change in the exposure time of camera 50 is not limited to the adjustment of the driving voltage of the iris. For example, the adjustment of the voltage (gain) applied to a light transmitting element related to the imaging element of camera 50 may be performed. Alternatively, both the driving voltage of the iris and the voltage applied to the light transmitting element may be adjusted.

(h3. Setting of Gamma Value)

Figure 22:
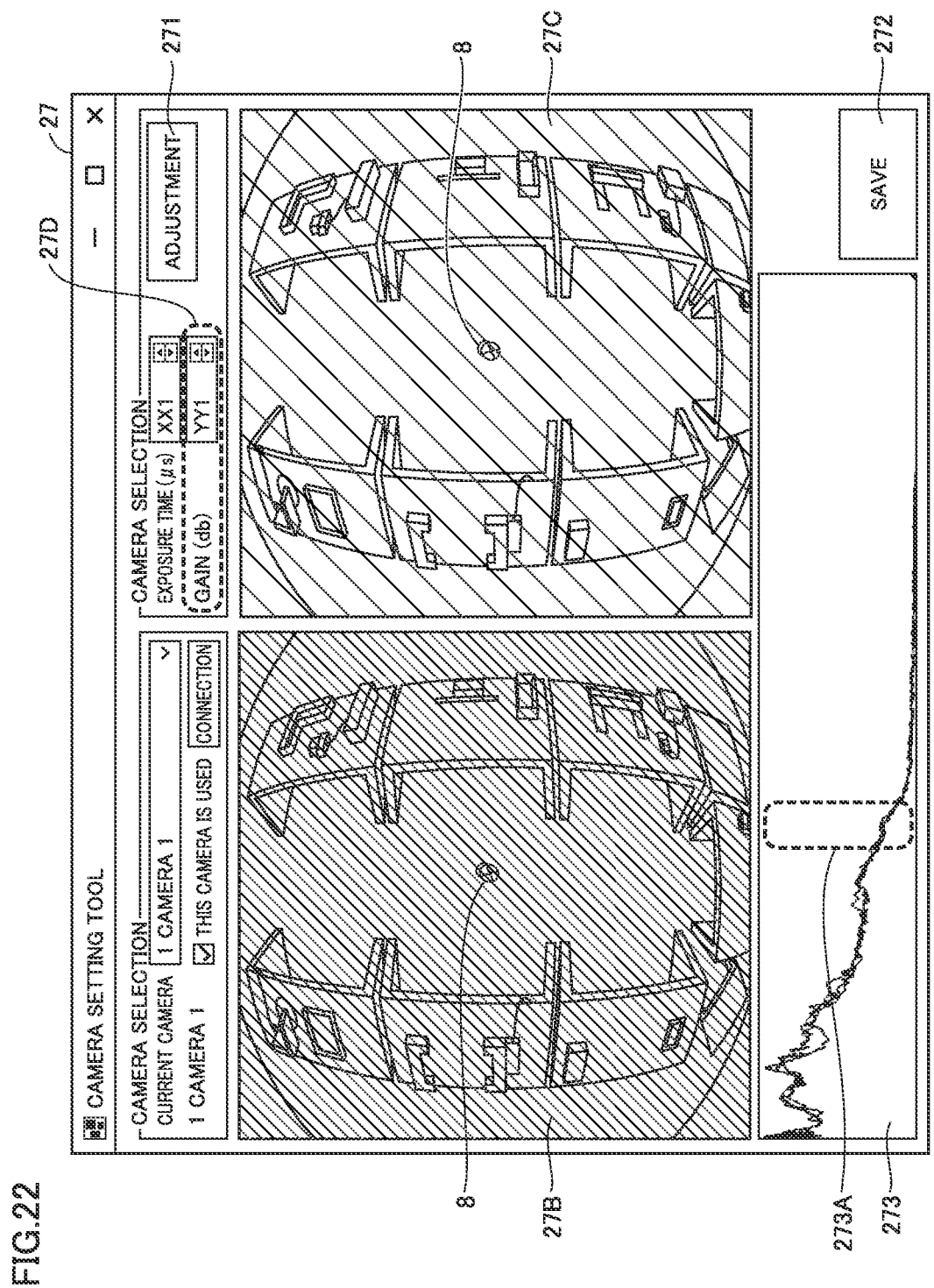
FIG. 22 is a view schematically illustrating an example of a GUI screen setting a gamma value of the embodiment.

As described above, the captured image of camera 50 in which the gain preventing the overexposure tends to be dark as a whole. Even such the captured image, processor 21 determines a parameter of brightness adjustment (correction) processing for the image such that the captured image can be output as the image with appropriate brightness, for example, the captured image can be displayed on the display. This parameter is stored as the gamma value 4G. FIG. 22 is a view schematically illustrating an example of the GUI screen for setting the gamma value of the embodiment.

Specifically, the image of the GUI in FIG. 22 includes a left area in FIG. 22 in which the captured image before the brightness adjustment is performed is displayed, a graphical object that receives the user operation changing gamma value 4G as the adjustment parameter, and a right area in FIG. 22 in which the captured image in which the brightness adjustment is performed based on the changed adjustment parameter is displayed. As described above, dark image 27B captured by gain-adjusted camera 50 is displayed on the left side in FIG. 22, and an image 27C is displayed on the right side. Image 27C indicates the brightly-corrected image obtained by processor 21 performing the image processing on the image data of image 27B using gamma value 4G changed by the user operation as digital setting unit 203. Cursor 273A in area 273 is an example of a graphical object configured to be able to receive the user operation. Cursor 273A constitutes a slider capable of sliding operation in the left-right direction along an object of a color spectrum displayed in area 273 extending in the left-right direction of the screen in FIG. 22.

When cursor 273A is slid, digital setting unit 203 acquires the RGB values of a spectral distribution corresponding to the position of cursor 273A after the operation, and searches for the corresponding gamma value from a look up table (LUT) stored in storage 23 based on the acquired RGB values. The plurality of RGB values and the gamma value indicating the brightness of the image corresponding to each RGB value are registered in the LUT. Digital setting unit 203 performs known gamma correction processing for image brightness correction on the image data of image 27B based on the acquired gamma value, acquires the corrected image, and displays image 27C indicating the corrected image. The user continues the slide operation of cursor 273A until the user can visually recognize that image 27C that is gamma-corrected indicates the desired brightness. For each slide operation, digital setting unit 203 performs the gamma correction processing using the gamma value corresponding to the position of cursor 273A after the operation, and displays image 27C of the corrected image.

When the user visually recognizes that image 27C is displayed with the desired brightness, the user operates button 272. Digital setting unit 203 stores the gamma value corresponding to the position of cursor 273A when button 272 is operated as gamma value 4G.

In the embodiment, the gamma correction processing is described as the brightness adjustment processing of the captured image. However, the embodiment is not limited thereto. For example, processor 21 performs a predetermined arithmetic operation using a brightness component, a saturation component, or both that is the value of each pixel constituting the image and changes the value of each pixel to the value after the arithmetic operation, whereby processor 21 may adjust the brightness of the entire image.

(h4. Setting of Color Distribution Information)

Figure 23:
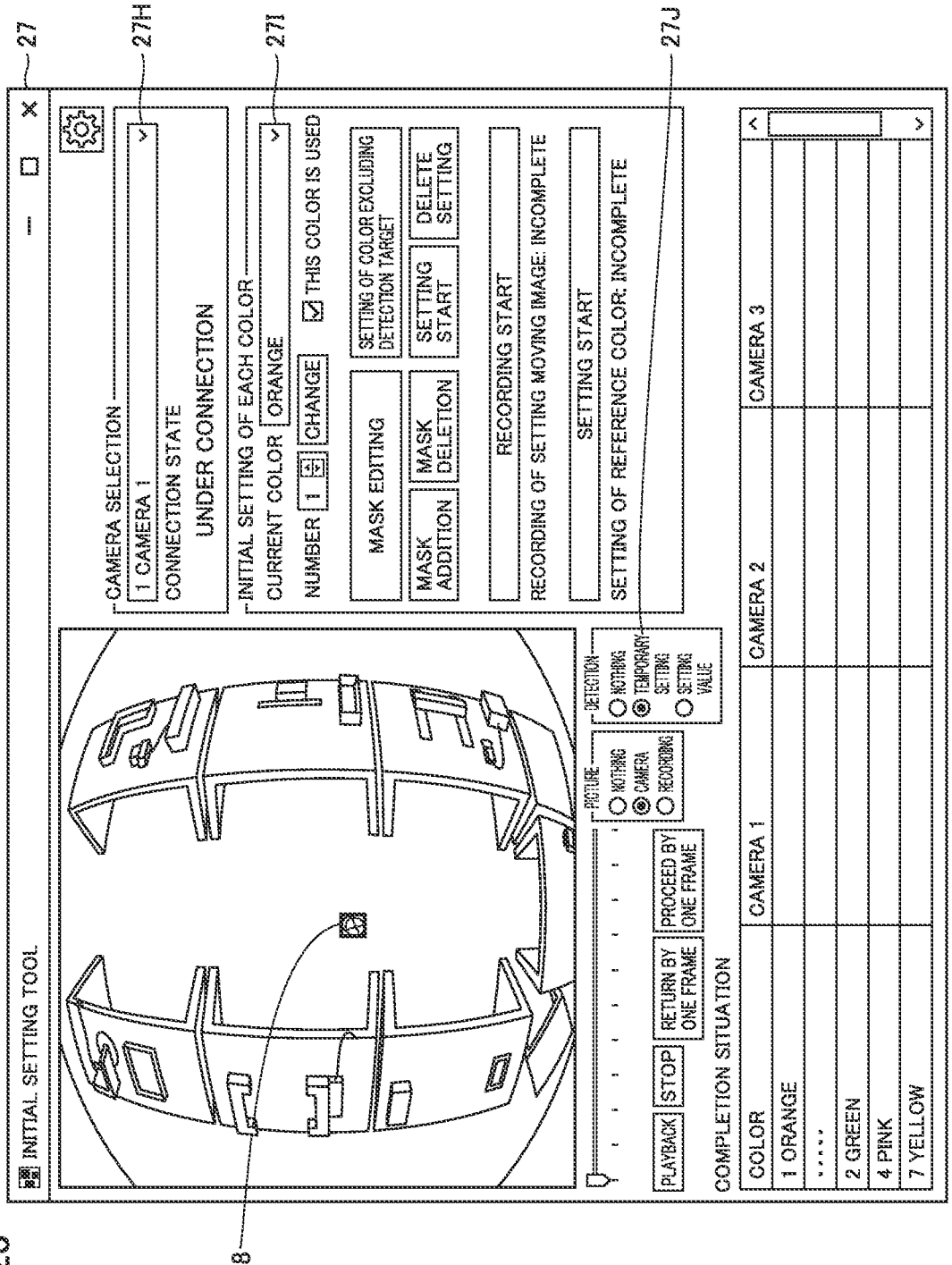
FIG. 23 is a view schematically illustrating an example of a GUI screen setting the color distribution information 241 of the embodiment.

FIGS. 23 and 24 are views schematically illustrating an example of the GUI screen setting color distribution information 241 of the embodiment. The imaging condition of hat 8 of camera 50 changes depending on an illumination condition (types of light including artificial light, natural light, and ambient light, and the like) or a subject condition (position of hat 8, posture of hat 8 according to how to wear, and the like) in workplace 2, and the attribute (hue, saturation, and lightness) of the color of the partial image of hat 8 in the captured image of camera 50 also changes with such the change in the imaging condition. Accordingly, processor 21 acquires color distribution information 241 from the image acquired by imaging the hat 8 under various different imaging conditions as digital setting unit 203 such that the color type of hat 8 can be detected regardless of the change in the imaging condition.

The left side image in FIG. 23 is the captured image of camera 50. The worker wearing orange hat 8 moves in workplace 2 that is the imaging field of view. The user operates an icon 27H to set camera 50, and operates an icon 27I to set the "orange" that is the color of hat 8. When the user operates a tab 27J, the color detection is performed by digital setting unit 203.

With reference to FIG. 24, when the user operates a button 27E, processor 21 outputs an imaging start command to camera 50 according to the operation, and records the image (moving image) output from camera 50. Processor 21 continues the recording until receiving an end operation from the user. During the period from a start to an end of the imaging, the worker wearing orange hat 8 walks in workplace 2 in various postures or in various ways.

When the user operates a button 27F after the end operation, processor 21 calculates the color attribute of hat 8 in the frame image for each frame image constituting the recorded moving image according to the operation, and plots the calculated color attribute for each frame image in the space of FIG. 14. Thus, the distribution of the attribute indicated by hatching for the orange in FIG. 14 is acquired. When the acquisition of the distribution of the attribute is completed in this manner, characters of "done" are displayed on an icon 27G, and the completion of the setting of the color distribution of the orange is notified.

Also for hat 8 of other color types (pink, yellow, orange), the distribution of the attribute indicated by an oblique line for the corresponding color in FIG. 14 is acquired by the same method as above-described hat 8 of the color of the "orange". As described above, digital setting unit 203 acquires and sets color distribution information 241 according to the user operation received through the GUIs in FIGS. 23 and 24. In the embodiment, when the plurality of cameras 50 are used, the setting by analog setting unit 201 and the setting by digital setting unit 203 are performed for each camera 50.

I. Modification

Processor 21 may calculate a walking amount (walking distance, number of walks, and the like) from entry to exit of the worker from workplace 2 based on a stride length of the worker and trajectory information 80, and include the calculated walking amount in flow line information 70. The walking amount calculated in this manner can be support information determining whether the way of movement of the worker in workplace 2 is appropriate.

J. Advantages

According to the embodiment described above, the worker is identified from the color type of hat 8 worn by the worker from the captured image of camera 50, so that a simple identification mechanism can be provided as compared with the method for identifying the ID attached to the hat as in Japanese Patent Laying-Open No. 2020-204819.

In addition, color distribution information 241 referred to in order to determine the color type is acquired from the image obtained by imaging workplace 2 where the worker wearing hat 8 walks by camera 50. Color distribution information 241 acquired in this manner is information reflecting imaging conditions that can be assumed for camera 50. Accordingly, the color type of hat 8 worn by the worker using color distribution information 241 can be accurately determined without the variation in imaging conditions.

Furthermore, even when the exposure amount of camera 50 is limited to detect the color type and the captured image becomes the dark image, the captured image is adjusted to the bright image by the gamma correction or the like and then output the bright image (transfer to analysis device 10, display on the display, storage in the storage, and the like). Thus, the image having excellent visibility can be provided to the user.

K. Appendix

In the present disclosure, the following configurations are indicated.
(Configuration 1)
A detection system including:
an image acquisition unit (202) configured to acquire a captured image of a workplace (2), the captured image being captured by a camera (50) that is installed above the workplace and has a substantially vertically downward imaging direction;
a partial image detection unit (204) configured to detect a partial image representing a wearing object worn by a worker from the captured image acquired;
a position information acquisition unit (204) configured to acquire position information indicating a position where the partial image is detected in the acquired captured image;
an adjustment information acquisition unit configured to acquire, for the acquired captured image, adjustment information for displaying the captured image in which brightness is adjusted; and
an output unit (205, 19) configured to output, for the acquired captured image, the position information acquired from the captured image and the adjustment information acquired for the captured image.
(Configuration 2)
The detection system according to configuration 1, in which the adjustment information includes the captured image in which the brightness is adjusted based on an adjustment parameter (4G).
(Configuration 3)
The detection system according to configuration 1, in which the adjustment information includes the acquired captured image and an adjustment parameter (4G) for brightness adjustment to the captured image.
(Configuration 4)
The detection system according to configuration 2 or 3, in which the adjustment information acquisition unit includes a setting unit (203) configured to output a GUI that receives a user operation for setting the adjustment parameter.
(Configuration 5)
The detection system according to configuration 4, in which the GUI includes an area displaying a captured image before the brightness is adjusted, an object receiving a user operation for changing the adjustment parameter, and an area displaying a captured image in which the brightness is adjusted based on the adjustment parameter.

(Configuration 6)

The detection system according to any one of configurations 1 to 5, further including:
  a storage unit (23) configured to store reference information (241) referred to in order to determine a color type; and
  a color detection unit (204) configured to detect a color type of the wearing object from the partial image representing the wearing object of the worker in the acquired captured image based on the reference information stored in the storage unit.

(Configuration 7)

The detection system according to configuration 6, in which
  the reference information includes, for each of a plurality of types of colors, a distribution of an attribute value of each of the colors in a color space, and
  the color detection unit detects the color type of the wearing object based on whether an attribute value of a color owned by the partial image representing the wearing object of the worker in the acquired captured image corresponds to the attribute value in the distribution of various colors indicated by the reference information.

(Configuration 8)

The detection system according to configuration 7, further including a setting unit (203) configured to acquire the reference information and store the reference information in the storage unit,
  in which the reference information includes a distribution in the color space of the attribute value of the color owned by the partial image of the wearing object in the captured image captured by the camera under different imaging conditions for the wearing object of each of the plurality of types of colors.

(Configuration 9)

The detection system according to any one of configurations 1 to 8, further including a mask area setting unit configured to set a mask area (28) in a captured image obtained by imaging the workplace,
  in which the position information acquisition unit acquires the position information indicating a position of the partial image representing the wearing object in an area excluding the mask area in the acquired captured image.

(Configuration 10)

The detection system according to any one of configurations 1 to 9, in which
  the captured image acquired by the image acquisition unit includes a captured image captured in time series by the camera,
  the position information acquisition unit further acquires information for time when the partial image is detected in the time-series captured image acquired, and
  the position information includes the information for the time in association with the position information.

(Configuration 11)

A method including:
  acquiring a captured image of a workplace (2) captured by a camera (50) that is installed above the workplace and has a substantially vertically downward imaging direction (S1);
  detecting a partial image representing a wearing object worn by a worker from the captured image acquired (S2);
  acquiring position information indicating a position where the partial image is detected in the acquired captured image (S3);
  acquiring, for the acquired captured image, adjustment information for displaying the captured image in which brightness is adjusted; and
  outputting, for the acquired captured image, the position information acquired from the captured image and the adjustment information acquired for the captured image.

(Configuration 12)

A non-transitory machine-readable storage medium having stored thereon instructions that, when executed, cause one or more processors to perform the method of configuration 11.

Although the embodiment of the present invention have been described, it should be considered that the disclosed embodiment is an example in all respects and not restrictive. The scope of the present invention is indicated by the claims, and it is intended that all modifications within the meaning and scope of the claims are included in the present invention.

What is claimed is:

1. A detection system comprising:
  an image acquisition unit configured to acquire a captured image of a workplace, the captured image being captured by a camera that is installed above the workplace and has a substantially vertically downward imaging direction;
  a partial image detection unit configured to detect a partial image representing a wearing object worn by a worker from the captured image acquired;
  a position information acquisition unit configured to acquire position information indicating a position where the partial image is detected in the acquired captured image;
  an adjustment information acquisition unit configured to acquire, for the acquired captured image, adjustment information for displaying the captured image in which brightness is adjusted; and
  an output unit configured to output, for the acquired captured image, the position information acquired from the captured image and the adjustment information acquired for the captured image,
  wherein the adjustment information includes the captured image in which the brightness is adjusted based on an adjustment parameter, and
  wherein the adjustment information acquisition unit includes a setting unit configured to output a GUI that receives a user operation for setting the adjustment parameter.

2. The detection system according to claim 1, wherein the GUI includes an area displaying the captured image before the brightness is adjusted, an object receiving a user operation for changing the adjustment parameter, and an area displaying the captured image in which the brightness is adjusted based on the adjustment parameter.

3. The detection system according to claim 1, further comprising:
  a storage unit configured to store reference information referred to in order to determine a color type; and
  a color detection unit configured to detect a color type of the wearing object from the partial image representing the wearing object of the worker in the acquired captured image based on the reference information stored in the storage unit.

4. The detection system according to claim 3, wherein
the reference information includes, for each of a plurality of types of colors, a distribution of an attribute value of each of the colors in a color space, and
the color detection unit detects the color type of the wearing object based on whether an attribute value of a color owned by the partial image representing the wearing object of the worker in the acquired captured image corresponds to the attribute value in the distribution of various colors indicated by the reference information.

5. The detection system according to claim 4, wherein the setting unit is configured to acquire the reference information and store the reference information in the storage unit,
wherein the reference information includes a distribution in the color space of the attribute value of the color owned by the partial image of the wearing object in the captured image captured by the camera under different imaging conditions for the wearing object of each of the plurality of types of colors.

6. The detection system according to claim 1, further comprising a mask area setting unit configured to set a mask area in the captured image obtained by imaging the workplace,
wherein the position information acquisition unit acquires position information indicating a position of the partial image representing the wearing object in an area excluding the mask area in the acquired captured image.

7. The detection system according to claim 1, wherein
the captured image acquired by the image acquisition unit includes a captured image captured in time series by the camera,
the position information acquisition unit further acquires information for time when the partial image is detected in the time-series captured image acquired, and
the position information includes the information for the time in association with the position information.

8. A detection system comprising:
an image acquisition unit configured to acquire a captured image of a workplace, the captured image being captured by a camera that is installed above the workplace and has a substantially vertically downward imaging direction;
a partial image detection unit configured to detect a partial image representing a wearing object worn by a worker from the captured image acquired;
a position information acquisition unit configured to acquire position information indicating a position where the partial image is detected in the acquired captured image;
an adjustment information acquisition unit configured to acquire, for the acquired captured image, adjustment information for displaying the captured image in which brightness is adjusted; and
an output unit configured to output, for the acquired captured image, the position information acquired from the captured image and the adjustment information acquired for the captured image,
wherein the adjustment information includes the acquired captured image and an adjustment parameter for brightness adjustment to the captured image, and wherein the adjustment information acquisition unit includes a setting unit configured to output a GUI that receives a user operation for setting the adjustment parameter.

9. The detection system according to claim 8, wherein the GUI includes an area displaying the captured image before the brightness is adjusted, an object receiving a user operation for changing the adjustment parameter, and an area displaying the captured image in which the brightness is adjusted based on the adjustment parameter.

10. The detection system according to claim 8, further comprising:
a storage unit configured to store reference information referred to in order to determine a color type; and
a color detection unit configured to detect a color type of the wearing object from the partial image representing the wearing object of the worker in the acquired captured image based on the reference information stored in the storage unit.

11. The detection system according to claim 10, wherein:
the reference information includes, for each of a plurality of types of colors, a distribution of an attribute value of each of the colors in a color space, and
the color detection unit detects the color type of the wearing object based on whether an attribute value of a color owned by the partial image representing the wearing object of the worker in the acquired captured image corresponds to the attribute value in the distribution of various colors indicated by the reference information.

12. The detection system according to claim 11, wherein the acquiring the adjustment information comprises acquiring the reference information and storing the reference information,
wherein the reference information includes a distribution in the color space of the attribute value of the color owned by the partial image of the wearing object in the captured image captured by the camera under different imaging conditions for the wearing object of each of the plurality of types of colors.

13. The detection system according to claim 8, further comprising a mask area setting unit configured to set a mask area in the captured image obtained by imaging the workplace,
wherein the position information acquisition unit acquires position information indicating a position of the partial image representing the wearing object in an area excluding the mask area in the acquired captured image.

14. The detection system according to claim 8, wherein:
the captured image acquired by the image acquisition unit includes a captured image captured in time series by the camera,
the position information acquisition unit further acquires information for time when the partial image is detected in the time-series captured image acquired, and
the position information includes the information for the time in association with the position information.

15. A method comprising:
acquiring a captured image of a workplace captured by a camera that is installed above the workplace and has a substantially vertically downward imaging direction;
detecting a partial image representing a wearing object worn by a worker from the captured image acquired;
acquiring position information indicating a position where the partial image is detected in the acquired captured image;

acquiring, for the acquired captured image, adjustment information for displaying the captured image in which brightness is adjusted; and outputting, for the acquired captured image, the position information acquired from the captured image and the adjustment information acquired for the captured image, wherein the adjustment information includes the captured image in which the brightness is adjusted based on an adjustment parameter, and wherein the acquiring the adjustment information comprises outputting a GUI that receives a user operation for setting the adjustment parameter.

16. A non-transitory machine-readable storage medium having stored thereon instructions that, when executed by one or more processors, cause the one or more processors to perform a method comprising:

acquiring a captured image of a workplace captured by a camera that is installed above the workplace and has a substantially vertically downward imaging direction;

detecting a partial image representing a wearing object worn by a worker from the captured image acquired;

acquiring position information indicating a position where the partial image is detected in the acquired captured image;

acquiring, for the acquired captured image, adjustment information for displaying the captured image in which brightness is adjusted; and outputting, for the acquired captured image, the position information acquired from the captured image and the adjustment information acquired for the captured image, wherein the adjustment information includes the captured image in which the brightness is adjusted based on an adjustment parameter, and wherein the acquiring the adjustment information comprises outputting a GUI that receives a user operation for setting the adjustment parameter.

17. A method comprising:

acquiring a captured image of a workplace, the captured image being captured by a camera that is installed above the workplace and has a substantially vertically downward imaging direction;

detecting a partial image representing a wearing object worn by a worker from the captured image that is acquired;

acquiring position information indicating a position where the partial image is detected in the acquired captured image;

acquiring, for the acquired captured image, adjustment information for displaying the captured image in which brightness is adjusted; and outputting, for the acquired captured image, the position information acquired from the captured image and the adjustment information acquired for the captured image, wherein the adjustment information includes the acquired captured image and an adjustment parameter for brightness adjustment to the captured image, and wherein the acquiring the adjustment information comprises outputting a GUI that receives a user operation for setting the adjustment parameter.

18. A non-transitory machine-readable storage medium having stored thereon instructions that, when executed by one or more processors, cause the one or more processors to perform a method comprising:

acquiring a captured image of a workplace, the captured image being captured by a camera that is installed above the workplace and has a substantially vertically downward imaging direction;

detecting a partial image representing a wearing object worn by a worker from the captured image that is acquired;

acquiring position information indicating a position where the partial image is detected in the acquired captured image;

acquiring, for the acquired captured image, adjustment information for displaying the captured image in which brightness is adjusted; and outputting, for the acquired captured image, the position information acquired from the captured image and the adjustment information acquired for the captured image, wherein the adjustment information includes the acquired captured image and an adjustment parameter for brightness adjustment to the captured image, and wherein the acquiring the adjustment information comprises outputting a GUI that receives a user operation for setting the adjustment parameter.

* * * * *